US011029418B2

(12) United States Patent
Adler

(10) Patent No.: US 11,029,418 B2
(45) Date of Patent: Jun. 8, 2021

(54) MICRO-DOSE CALIBRATOR

(71) Applicant: THE UNITED STATES OF AMERICA, as represented by THE SECRETARY, DEPARTMENT OF HEALTH AND HUMAN SERVICES, Bethesda, MD (US)

(72) Inventor: Stephen S. Adler, Chevy Chase, MD (US)

(73) Assignee: THE UNITED STATES OF AMERICA, AS REPRESENTED BY THE SECRETARY, DEPARTMENT OF HEALTH AND HUMAN SERVICES, Bethesda, MD (US)

( * ) Notice: Subject to any disclaimer, the term of this patent is extended or adjusted under 35 U.S.C. 154(b) by 0 days.

(21) Appl. No.: 16/644,441

(22) PCT Filed: Sep. 4, 2018

(86) PCT No.: PCT/US2018/049399
§ 371 (c)(1),
(2) Date: Mar. 4, 2020

(87) PCT Pub. No.: WO2019/050862
PCT Pub. Date: Mar. 14, 2019

(65) Prior Publication Data
US 2020/0233099 A1 Jul. 23, 2020

Related U.S. Application Data

(60) Provisional application No. 62/554,980, filed on Sep. 6, 2017.

(51) Int. Cl.
*G01T 1/16* (2006.01)
*G01T 1/167* (2006.01)
(Continued)

(52) U.S. Cl.
CPC ............ *G01T 1/167* (2013.01); *G01T 1/2006* (2013.01); *G01T 1/2023* (2013.01); *G01T 7/005* (2013.01)

(58) Field of Classification Search
CPC ..... G01T 1/167; G01T 1/2006; G01T 1/2023; G01T 7/005
See application file for complete search history.

(56) References Cited

U.S. PATENT DOCUMENTS

| 2,550,107 A | 4/1951 | Coltman |
| 3,409,776 A | 11/1968 | Pipher et al. |

(Continued)

FOREIGN PATENT DOCUMENTS

| JP | H04331396 A | 11/1992 |
| JP | H05302981 A | 11/1993 |

(Continued)

OTHER PUBLICATIONS

O'Kelley, "Detection and Measurement of Nuclear Radiation", Subcommittee on Radiochemistry, National Academy of Sciences—National Research Council, pp. 1-138 (Apr. 1962).

(Continued)

*Primary Examiner* — Hugh Maupin
(74) *Attorney, Agent, or Firm* — Klarquist Sparkman, LLP

(57) ABSTRACT

Methods and apparatus for calibrating radioactive sources are described. An array of scintillation detectors forms a receptacle within which a sample or sample container can be retained by a holder. The scintillation detectors are coupled via light transducers such as photomultiplier tubes (PMTs) to independent electronic counters. Coincidence processing of time-tagged events yields a correlated event rate. One or more corrections can be applied as needed, for background counts, deadtime, or random coincidences. Voltage tuning of (Continued)

PMTs yields improved reproducibility. Accuracy of 1% has been demonstrated over a range of 10 kBq-3 MBq.

20 Claims, 20 Drawing Sheets

(51) Int. Cl.
*G01T 1/20* (2006.01)
*G01T 1/202* (2006.01)
*G01T 7/00* (2006.01)

(56) References Cited

U.S. PATENT DOCUMENTS

| | | | |
|---|---|---|---|
| 3,796,879 A | 3/1974 | Obrycki | |
| 3,898,463 A | 8/1975 | Noakes | |
| 3,944,832 A | 3/1976 | Kalish | |
| 4,066,908 A | 1/1978 | Farukhi et al. | |
| 4,131,798 A | 12/1978 | Reddy et al. | |
| 4,204,123 A | 5/1980 | Stoddart | |
| 4,352,018 A | 9/1982 | Tanaka et al. | |
| 4,563,582 A | 1/1986 | Mullani | |
| 4,578,588 A | 3/1986 | Galkin | |
| 4,767,929 A | 8/1988 | Valentine | |
| 5,198,670 A | 3/1993 | VanCauter et al. | |
| 5,656,807 A | 8/1997 | Packard | |
| 5,998,792 A | 12/1999 | DiFilippo | |
| 6,087,663 A | 7/2000 | Moisan et al. | |
| 6,267,717 B1* | 7/2001 | Stoll | A61N 5/1002 600/1 |
| 6,267,775 B1 | 7/2001 | Clerc et al. | |
| 6,508,784 B1 | 1/2003 | Shu | |
| 6,607,476 B1 | 8/2003 | Barnhart | |
| 7,126,126 B2 | 10/2006 | Schyler et al. | |
| 7,339,172 B2 | 3/2008 | Rowland et al. | |
| 7,608,831 B2 | 10/2009 | Lamb et al. | |
| 8,304,738 B2 | 11/2012 | Gagnon et al. | |
| 8,470,214 B2 | 6/2013 | Corbeil et al. | |
| 2003/0146759 A1* | 8/2003 | Bashkirov | H01J 49/40 324/464 |
| 2011/0220802 A1* | 9/2011 | Frisch | G01T 1/2928 250/363.03 |
| 2014/0252238 A1* | 9/2014 | Jung | G01T 1/023 250/362 |
| 2017/0167915 A1* | 6/2017 | Zhao | H01J 43/30 |

FOREIGN PATENT DOCUMENTS

| | | |
|---|---|---|
| JP | H09304540 A | 11/1997 |
| JP | 2010101682 A | 5/2010 |
| JP | 2012021977 A | 2/2012 |
| WO | WO 97/16746 | 5/1997 |
| WO | WO 03/001242 A1 | 1/2003 |

OTHER PUBLICATIONS

Lamperti et al., "NIST Measurement Services: Calibration of X-Ray and Gamma-Ray Measuring Instruments", National Institute of Standards and Technology, Special Publication 250-58, pp. 1-87 (Apr. 2001).
Saint-Gobain Crystals, "Efficiency Calculations for Selected Scintillators", www.crystals.saint-gobain.com, 16 pages (2014).
Adler et al., "Design and performance of the micro-dose calibrator", Phys. Med. Biol. 63, pp. 1-13 (2018).
Adler et al., "A Study of $^{219}$Rn Outgassing and $^{211}$Pb Contamination From $^{223}$Ra in Dry, Liquid, and Murine Tissue Samples", Health Phys., 118(2), pp. 149-161 (2020).

* cited by examiner

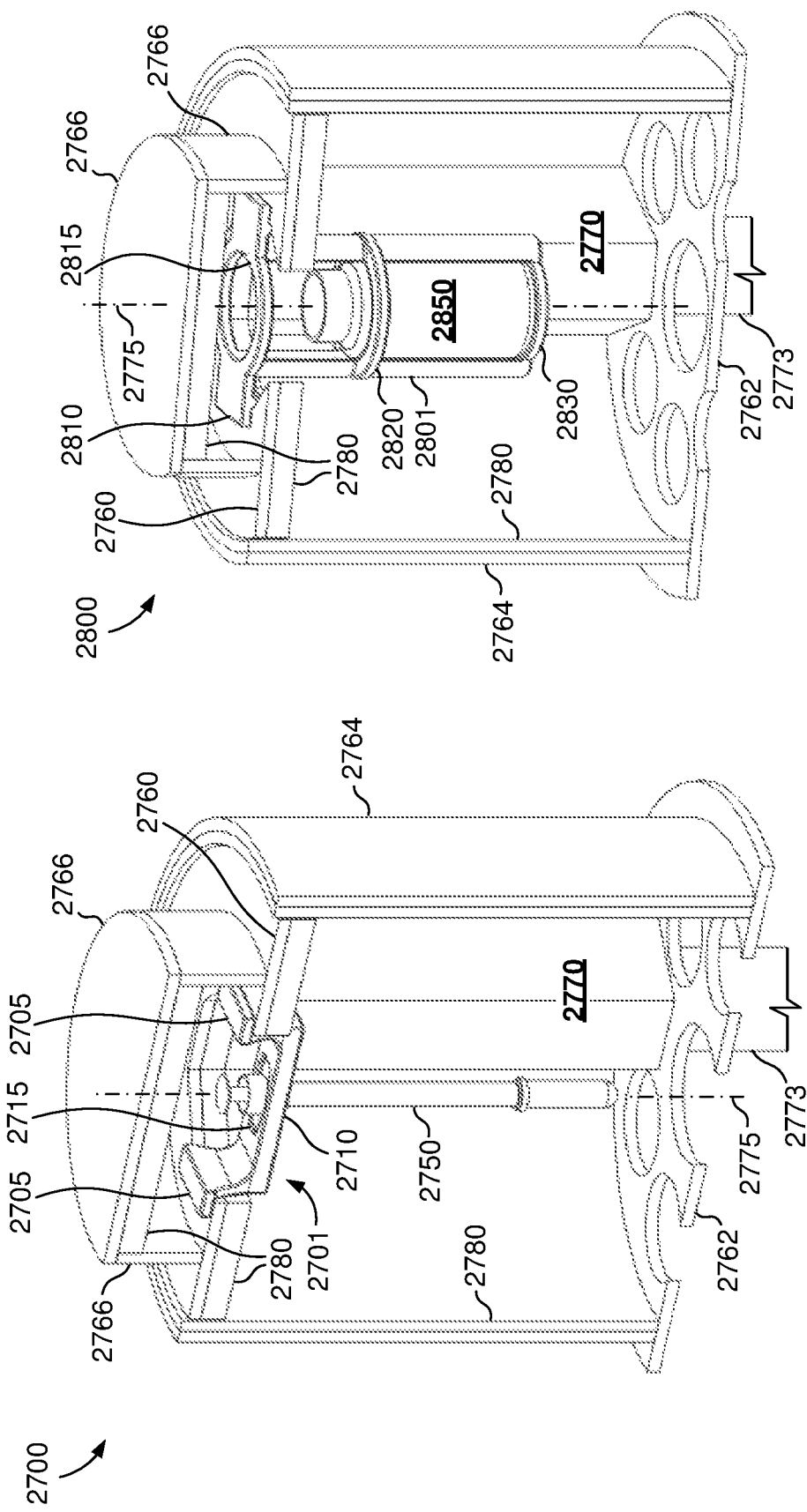

MICRO-DOSE CALIBRATOR

CROSS REFERENCE TO RELATED APPLICATIONS

This is the U.S. National Stage of International Application No. PCT/US2018/049399, filed Sep. 4, 2018, which was published in English under PCT Article 21(2), which in turn claims the benefit of U.S. Provisional Patent Application No. 62/554,980, filed Sep. 6, 2017, both of which are incorporated in their entirety herein by reference.

STATEMENT OF GOVERNMENT SUPPORT

This invention was made with Government support under project number ZIA BC 010668 by the National Institutes of Health, National Cancer Institute, and under contract number HHSN2632009000261 by the National Institutes of Health, National Cancer Institute. The Government has certain rights in the invention.

FIELD

This disclosure relates to a calibrator for determining the amount of radioactivity in a radioactive sample, as well as a method of operation of the calibrator.

BACKGROUND

Radioactive tracers are used in pre-clinical biodistribution and dosimetry studies. Radioactive tracers can be delivered in chemical form (such as fluorodeoxyglucose (FDG) or a radioligand) or as labeled cells. In cell-labeling applications, stem cells, T cells, dendritic cells, and monocytes can be labeled. Applications include development of stem cell therapies and cancer research. Cell labeling applications will also extend to human clinical trials of cell therapies.

Desired dose levels are limited to a few µCi to avoid cell damage or to avoid detector saturation when making subsequent tissue activity measurements. However, accurate calibration of delivered doses with conventional technology can be challenging. Conventional well-counters suffer from saturation above about 0.1 µCi, while conventional dose calibrators suffer from noise below about 10 µCi. Thus, there remains a need for improved calibration technology for radioactive micro-doses.

SUMMARY

The foregoing need is met by the disclosed micro-dose calibrator. The calibrator has a receptacle containing a sample chamber within which the radioactive micro-dose sample can be retained. An array of at least three scintillation detectors is disposed around the sample chamber. An array of light transducers are optically coupled to respective scintillation detectors, and electronic counters are provided for the scintillation detectors. The light transducers are electrically coupled to respective electronic counters for counting radioactive decay events of the radioactive micro-dose corresponding to particles detected by their respective scintillation detectors.

In some embodiments, the scintillation detectors are annularly disposed around the sample chamber. The scintillation detectors can be mutually complementary in shape and contiguously disposed in a ring. The shapes of the scintillation detectors can conform to adjacent detectors. The scintillation detectors can be substantially the same shape and size, and can form the receptacle. Four to 20 scintillation detectors can be used, or as few as three, or as many as 128 or 256. In some examples, the scintillation detectors can be disposed over at least a hemisphere about a center of the sample chamber.

In some embodiments, the scintillation detectors can incorporate a scintillation crystal, such as $BaF_2$, BGO, $CdWO_4$, CsI, GSO, LSO, LYSO, NaI, YAP, or ZnS. The crystal can be doped with a dopant such as Ag, Ce, Eu, or Tl. Particularly, NaI (Tl) can be used. Plastic scintillators can also be used.

In further embodiments, the light transducers are photomultiplier tubes (PMTs) or silicon photomultipliers (SiPM). The scintillation detectors can include opaque sheaths within which a scintillator material is disposed. Gaps between neighboring scintillation detectors can be controlled to have a maximum width in the range 0.001 mm-5 mm. The array of scintillation detectors can be stationary and not rotatable with respect to the sample, the sample chamber, or a sample holder.

In yet further embodiments, the micro-dose calibrator can include a holder configured to retain the sample at a fixed pre-selected position within the sample chamber. The holder can be configured to position the centroid of a radioactive micro-dose or a sample container at the centroid of the array of scintillation detectors. The sample container can be a vial or a syringe. Alternatively, the radioactive micro-dose can be provided as a tissue sample or as a live animal. In some examples, the micro-dose calibrator can include an adjustable stage operable to position a centroid of the micro-dose at a centroid of the array of scintillation detectors.

In additional embodiments, the radioactive decay particles can be photons having energies in the range 10 keV-2000 keV, or as low as 1 keV, or as high as 10 MeV. In some embodiments, the micro-dose calibrator can provide 1% accurate calibration for micro-doses having any gamma or x-ray radioactivity in the range 10 nCi to 10 µCi, or as high as 100 µCi, 1 mCi, or 10 mCi.

In some embodiments, the micro-dose calibrator includes one or more synchronization cables connecting the electronic counters. Each electronic counter can include a signal input connected to an associated light transducer, a discriminator, a time-tagger, a packetizer, and an accumulator. In some examples, an electronic counter can include a multi-channel analyzer.

In further embodiments, the micro-dose calibrator can include a computer system configured to execute instructions and implement an interactive user interface. The user interface can receive an input command to start a micro-dose calibration procedure and, upon completion of the procedure, can present the calibrated micro-dose strength on a display. The computer system can be further configured to process time-tagged events to determine a correlated event rate, and to determine the calibrated micro-dose strength by application of one or more calibration factors or corrections to the correlated event rate.

Also disclosed is a method of tuning voltages of the light transducers of a micro-dose calibrator. For each light transducer, photopeak amplitudes are measured at a plurality of applied voltages. A parameterized fit is performed on the photopeak vs. voltage data. Based on the fitted parameters, an operating voltage is determined that matches the photopeak energy of a target nuclide to a target photopeak amplitude. This operating voltage is set and used for calibration of a radioactive micro-dose containing the target nuclide.

In another example, a segmented well radioactivity detector includes an array of independent scintillation detectors that are arranged to define a bottom surface and a circumferential side surface of a well. The well is at least partially enclosed by the detector array. In some embodiments, all of the scintillation detectors are substantially the same size and shape, while in other embodiments, the scintillation detectors defining the circumferential surface have the same size and shape, while a scintillation detector defining the bottom surface of the well has a shape or size that differs from the circumferential detectors.

In some embodiments, the segmented well radioactivity detector further includes an array of photodetectors coupled to respective ones of the scintillation detectors, and electronic counters electrically coupled to the photodetectors. The electronic counters are operable to count, independently for each scintillation detector, radioactive decay events associated with decay particles detected by the respective scintillation detector. The segmented well radioactivity detector can include a holder configured to retain a radioactive sample or a sample container within the well. In some embodiments, an additional independent scintillation detector is positioned above the well.

In a further example, a method for calibrating a radioactive micro-dose is disclosed. A calibration apparatus or segmented well radioactivity detector is provided as disclosed herein, having a plurality of independent scintillation detectors. A micro-dose is received and positioned within a sample chamber or well. Micro-dose decay events detected by each scintillation detector are counted independently, and a radioactivity level is reported based on the independently counted decay events.

In varying embodiments, the micro-dose is received within a syringe, vial, or dose applicator, or as a tissue sample or live animal. The received micro-dose can have a nuclide selected from $^{18}$F, $^{64}$Cu, $^{68}$Ga, $^{76}$Br, $^{89}$Zr, $^{99m}$Tc, $^{111}$In, or $^{125}$I. The detected fraction of micro-dose decay events can be at least 40% for the target nuclide. The micro-dose can be positioned at a central location of the sample chamber or well, or at a predetermined location which substantially maximizes the geometric efficiency of the micro-dose calibrator or segmented well detector. A performance measure can be specified as a fraction of detected events for photons within an energy range, for example the fraction can be at least 40% for an energy range 20-511 keV. In varying embodiments, the specified fraction of detected events can be lower or higher than 40%, even as low as 1%, or even as high as 90%, or more. Calibration accuracy is another performance measure which can be specified, for example an error of ≤1% over the activity range 10 nCi-10 µCi, or over another activity range such as 10 nCi-100 µCi, 100 nCi-1 mCi, or any range within 1 nCi-100 mCi.

In additional embodiments, the independent counting includes time-tagging detected decay events, and the method also includes performing coincidence processing on the time-tagged events to determine a correlated event rate. The radioactivity level is determined based on the correlated event rate. The independent counting or time-tagging can be synchronized for the several scintillation detectors. Determining the radioactivity level can include applying a deadtime correction, applying a randoms correction, or applying a basic calibration factor.

In some embodiments, positioning the micro-dose includes positioning the micro-dose within a holder, or aligning a centroid of the micro-dose with a geometric center of the sample chamber or well.

In another example method, a ring of scintillation detectors is provided; the detectors are coupled by respective photodetectors to counting electronics. High-voltage power supplies coupled to the photodetectors are tuned so that photopeaks of a radioactive source appear at aligned energy channels. A sample container loaded with the radioactive micro-dose is received and positioned at a central location of the ring of scintillation detectors. The counting electronics are synchronized. Then, decay events detected at the scintillation detectors are time-tagged and counted, independently for each scintillation detector. Coincidence processing is performed on streams of time-tagged events from respective scintillation detectors to determine a correlated event rate. The micro-dose radioactivity level is determined and reported.

The determination of radioactivity level involves at least applying a basic calibration factor to the correlated event rate. In some embodiments, the determination can also include applying a deadtime correction. The deadtime correction can be established with a radioactive calibration source. Decay events detected by the scintillation detectors are measured during decay of the radioactive calibration source, and corresponding correlated event rates are obtained. Parameters of a deadtime model are evaluated by performing a parameterized fit to the correlated event rates, as a function of the decaying strength of the calibration source. Finally, the deadtime correction is determined by evaluating the deadtime model, using the fitted parameters, for the rates observed during the micro-dose calibration.

The foregoing and other features and advantages of the disclosed technology will become more apparent from the following detailed description of several embodiments which proceeds with reference to the accompanying figures.

BRIEF DESCRIPTION OF THE DRAWINGS

FIG. 27 is a cutaway perspective view of an embodiment of a syringe holder and syringe positioned within sample chamber of a representative micro-dose calibrator.

FIG. 28 is a cutaway perspective view of an embodiment of a vial holder and vial positioned within a sample chamber of a representative micro-dose calibrator.

DETAILED DESCRIPTION

Figure 1A:
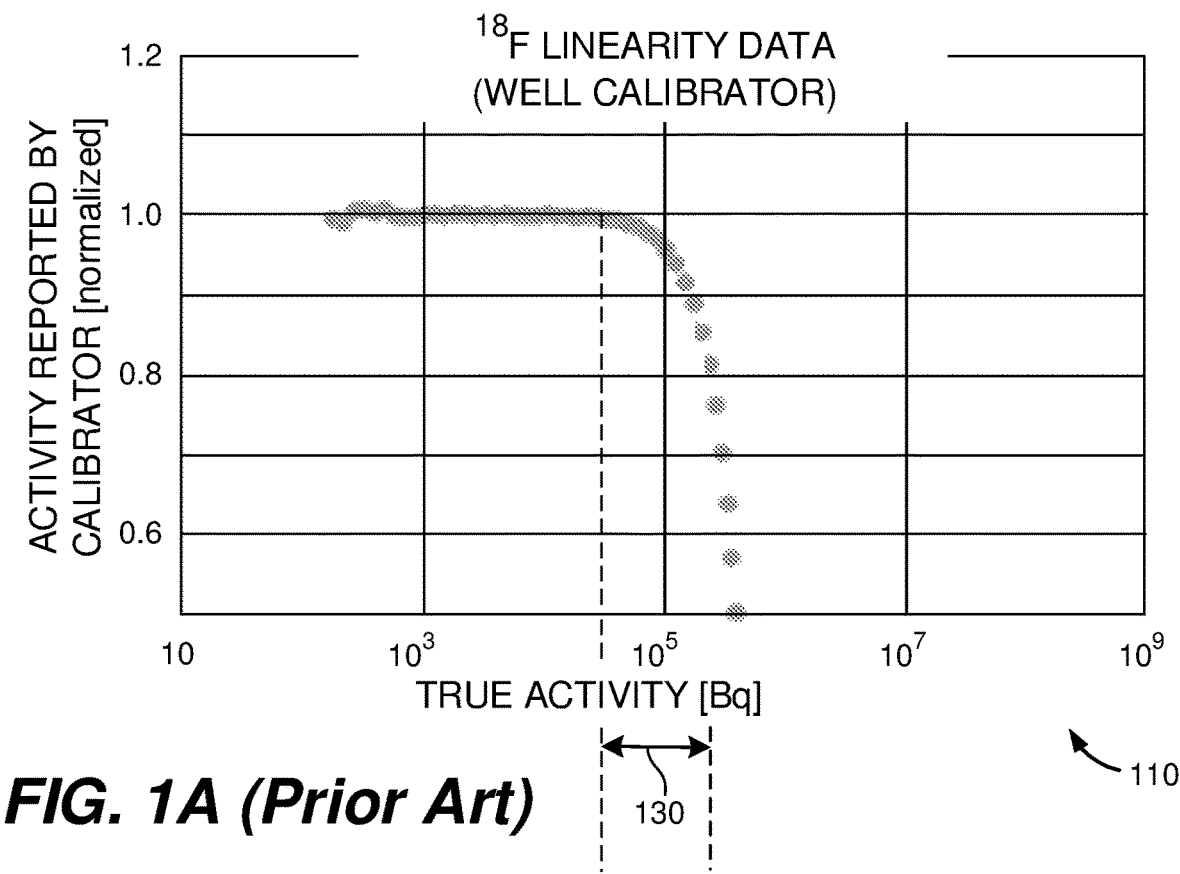
FIGS. 1A-1B are graphs illustrating the performance of prior art calibration apparatus.

As used herein, the singular forms "a", "an", and "the" include plural forms unless the context clearly dictates otherwise. Unless specifically stated or obvious from context, as used herein, the term "or" is understood to be inclusive. The term "including" is used herein to mean, and is used interchangeably with, the phrase "including but not limited to." The terms "comprises," "comprising," "containing," "having" and the like can have the meaning ascribed to them in U.S. Patent law and can mean "includes," "including," and the like; "consisting essentially of or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

An "array" of physical objects (such as scintillation detectors or light transducers) is a collection of the objects that have a defined spatial relationship. In some examples, the spatial relationships are regular, meaning that at least two pairs of the objects have substantially similar relative spacing and/or relative orientation. In other examples, an array can have defined but irregular spatial relationships.

"Calibration" of a micro-dose refers to a determination of the radioactivity level of the micro-dose to a given accuracy or tolerance. In some examples, the given tolerance can be about 1%, or a different value between 0.01% and 20%. Generally, longer sampling times permit greater accuracy, i.e. a smaller tolerance number. "Calibration" of a measurement apparatus, such as a micro-dose calibrator, refers to a determination of one or more parameters required to obtain an accurate measurement from the apparatus; these parameters can include, without limitation, a basic calibration coefficient, a background rate, a deadtime model parameter, or a geometric efficiency parameter.

A "central location" of a sample chamber is a location at or near the centroid of the sample chamber such that the change in micro-dose measurement between the central location and the centroid is within the specified measurement accuracy. The central location can be further constrained to maintain imbalance between detector count rates within a tolerance, for example in applications in which a deadtime correction is applied.

"Coincidence" refers to the detection of two or more particles in respective detectors at times that are within a coincidence time window. Due to statistical variations, two simultaneously occurring events can be detected at slightly different times. The coincidence time window can be set to accept simultaneously occurring events with some probability, such as 99%. The coincidence time window and the statistical variations in detected event times are both associated with the timing resolution of the micro-dose calibrator. The timing resolution is largely determined by scintillation properties of detector material, with some contributions from time-of-flight variations and variability in response time of the detector, light transducer, and associated electronics. Coincident events are often but not always associated with the same radioactive decay event; they can arise from random coincidences between decay events, or between decay events and external radioactivity sources.

"Coincidence processing" is a process of analyzing detected events to identify coincident events and optionally determine counts or rates of different types of coincidences, including non-coincident or singles events.

A "correlated rate" ("correlated count rate" or "correlated event rate") is determined from two or more event streams after discounting coincidences. For example, a three-way coincidence is counted just once, and not three times.

A signal is "electrically coupled" from one entity to another if the coupling occurs at least in part over an electrical conductor. The coupling need not be a direct current (DC) conducting path; DC blocking elements such as capacitors and transformers can be incorporated within an electrically coupled connection.

An "electronic counter" is a device that receives electrical signals corresponding to discrete events and counts the events. The electronic counter can optionally process analog signals and generate digitized packets, or pre-process events to reject, accept, or classify the events prior to counting. Counted events can be maintained as numbers of events or as rates. An electronic counter can be implemented in any combination or sub-combination of analog electronics, A/D converters, digital electronics, or software instructions executed on computing hardware. Components can be shared among two or more electronic counters.

A "light transducer" is a device which converts an optical signal into an electrical signal, such as a photomultiplier tube (PMT) or a silicon photomultiplier (SiPM). The term "photodetector" is synonymous.

A "micro-dose" is a radioactive sample having an activity level between 0.01 µCi (about 370 Bq) and 100 µCi (about 3.7 MBq). The micro-dose can be used for biological application, but is not restricted to such. The micro-dose can be in an inorganic form, or in a biological sample; the latter can be in vitro or in vivo.

A "micro-dose calibrator" is an apparatus suitable for calibrating a radioactive micro-dose; some disclosed micro-calibrators can calibrate radioactive doses outside the micro-dose range.

An "opaque" object does not transmit visible light, or transmits a fraction of incident visible light below a limit; the limit can be between 0 and $10^{-6}$. An opaque object can transmit x-rays or gamma rays.

A signal is "optically coupled" from one entity to another if the coupling occurs at least in part by one or more photons of the infrared, visible, or ultraviolet portions of the electromagnetic spectrum.

A "photomultiplier tube" ("PMT") is a device in which absorption of a single photon results in generation of multiple electrons which can be collected as an electrical signal. Common photomultiplier tubes operate by a combination of photoelectric effect and electron amplification through a chain of electrodes called dynodes.

A "radioactive nuclide" is a nuclear species that exhibits radioactivity, and is referred to as simply "nuclide" for short.

A "radioactive decay event" is a decay of a single atomic nucleus by emission of one or more particles. Alpha-, beta-, and gamma-decays are common types of decay events in which alpha particles, beta particles (including positrons), and gamma rays are respectively emitted as a nucleus undergoes decay. Positron and gamma decays are used for convenience in some examples for convenient illustration.

"Radioactive decay particles" include emitted particles, which are particles emitted during radioactive decay of a nuclide, and detected particles, which are particles detected by a scintillation detector. Photons are considered to be mass-less particles. Scintillation detectors are particularly suitable for detecting photons such as x-rays and gamma rays. For gamma sources, which decay by emission of at least one gamma ray photon, the detected particle can be the emitted particle itself. However, detected particles are not limited to emitted gamma rays. A positron decay source emits a positron, which rapidly experiences an annihilation with an electron, resulting in a pair of 511 keV photons. Also, gamma rays can experience Compton scattering within a scintillation detector, and the Compton scattered photon can be detected in another scintillation detector. In some examples, the detected particles are promptly generated from emitted particles, where promptly means on a timescale faster than a coincidence window. In other examples, the detected particles can be delayed with respect to the radioactive decay event, due to the existence of a metastable state or a short-lived daughter nuclide.

A "scintillation detector" is a class of particle detector that emits light when a detected particle deposits energy within the detector volume.

A "silicon photomultiplier" (SiPM) is a device in which absorption of a single photon results in generation of multiple electrons which can be collected as an electrical signal. Common SiPMs incorporate a series cascade of avalanche photodiodes and can operate at ≤100 V.

"Time-tagging" refers to an operation of assigning a time or timestamp to a detected event. The time tag (i.e., timestamp) can be attached to or embedded within a digital packet representing the time-tagged event. A portion of an electronic counter, or another entity, that performs time-tagging is a "time-tagger."

A "well" is a chamber in an apparatus which is enclosed by a bottom surface and a circumferential surface. A sample chamber need not be a well. A well can also have an enclosed top surface. Examples are described with reference to directions or directional labeling indicated as "above," "below," "upper," "lower," "top," "bottom," "side" and the like. These terms are used for convenient description, but do not imply any particular spatial orientation.

FIG. 1A is a graph 110 showing performance of a prior art well calibrator in which a radioactive sample is placed in a well of a single NaI scintillation detector. Decay events are detected by the scintillation detector, and the count rate of decay events is used to determine the amount of sample radioactivity. In FIG. 1A, true source radioactivity is plotted on the X-axis and the radioactivity reported by the well calibrator, normalized to the true radioactivity, is plotted on the Y-axis. For a perfect calibrator, the graph would show y=1.0 (reported activity equal to true activity) for all data points. The well calibrator suffers from saturation at high event rates: as event rates increase, the deadtime increases, and the live fraction (during which the detector is available to detect a fresh event) decreases. Thus, the illustrated response of the well calibrator visibly diminishes above about 30 kBq, and the well calibrator fails to provide accurate measurements above this radioactivity level, e.g. in the range 130 shown.

Figure 1B:
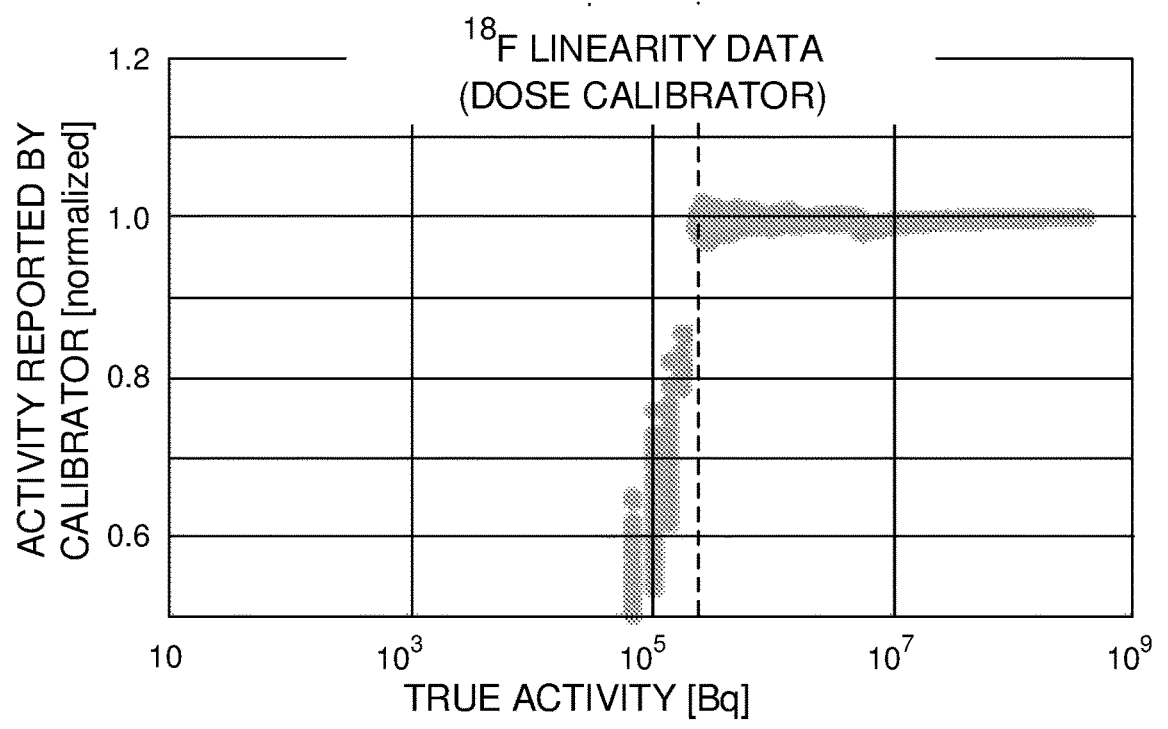

FIG. 1B is a graph 120 showing performance of a prior art dose calibrator, which measures current in a gas ionization chamber. The axes are the same as in FIG. 1A. Because the current measurement combines signals from many decay events, this dose calibrator provides satisfactory performance at high activity levels. However, the detection efficiency of a gas ionization chamber is very low, under 1%, because most gamma rays pass through the ionization chamber without interacting. A combination of low detection efficiency, electronic noise, and statistical fluctuations limits the performance at low activity levels. As shown in FIG. 1B, the response of the ionization chamber visibly deteriorates below about 200 kBq.

Thus the prior art calibrators have a gap, approximately between 30 kBq and 200 kBq, where accurate measurements are not obtained. Embodiments of a micro-dose calibrator, described herein, provide accurate measurement over this entire gap and beyond.

EXAMPLE 1

Micro-Dose Calibrator Apparatus

This example illustrates a micro-dose calibrator apparatus which is suitable for accurate determination of the radioactivity level of a sample micro-dose. FIGS. 2-7 show aspects of example micro-dose calibrator apparatus. Although the aspects of two or more of these figures can be combined in various ways in a single embodiment, one of ordinary skill will appreciate that each drawing stands on its own and does not imply any of the features shown or described for any of the other figures.

Figure 2:
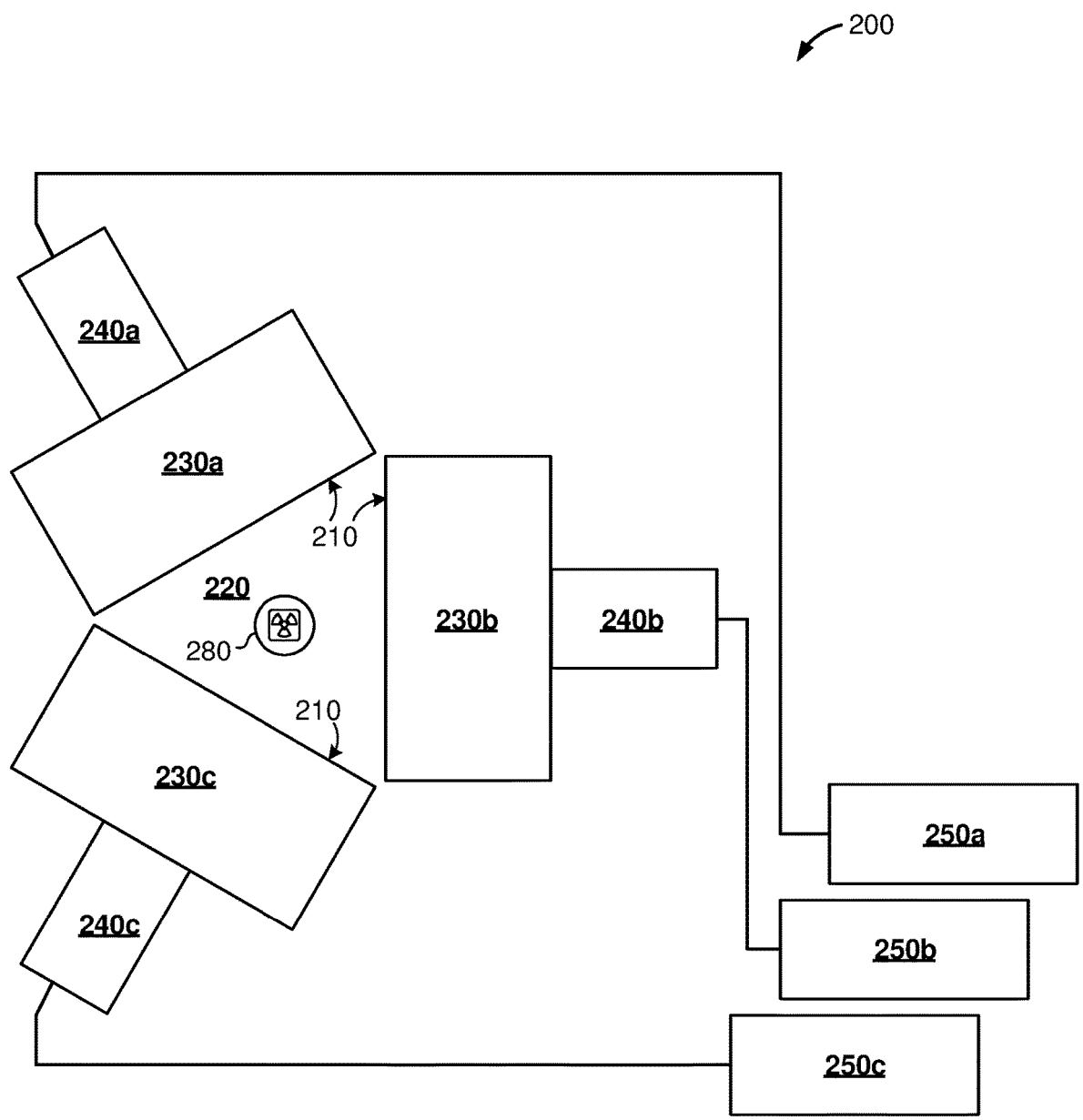
FIG. 2 is a schematic diagram of a first embodiment of a micro-dose calibrator.

FIG. 2 is a schematic diagram 200 of a first embodiment of a micro-dose calibrator according to the disclosed technology. An array of at least three scintillation detectors 230a-c is shown in plan view. The illustration shows a sample 280 which is a container, such as a syringe, in which a radioactive micro-dose is present. The sample 280 is retained within a sample chamber 220, which is an interior space of a receptacle 210. A retaining mechanism is omitted from FIG. 2 for clarity of illustration. In the illustration, receptacle 210 is formed by the inward facing surfaces of the scintillation detectors 230a-c, however, this is not a requirement. In other examples, one or more other structures can form the receptacle 210 and can define the sample chamber 220. The scintillation detectors 230a-c are arranged around the sample chamber 220, which in this disclosure means that every plane through the centroid of the sample chamber has at least a portion of a scintillation detector on either side of the plane. (A "side" of the plane refers to one of the half-spaces separated by the plane.)

Light transducers 240a-c, which can be photomultiplier tubes (PMTs), are optically coupled to respective scintillation detectors 230a-c. Respective electronic counters 250a-c are provided for each scintillation detector. The light transducers 240a-c are electrically coupled to the respective electronic counters 250a-c for counting particles detected by respective scintillation detectors from radioactive decay events of the radioactive micro-dose of sample 280.

In examples, each electronic counter 250a-c generates a stream of time-tagged events, which are processed by a coincidence processor to generate a correlated event rate, from which the sample radioactivity can be determined.

Figure 3:
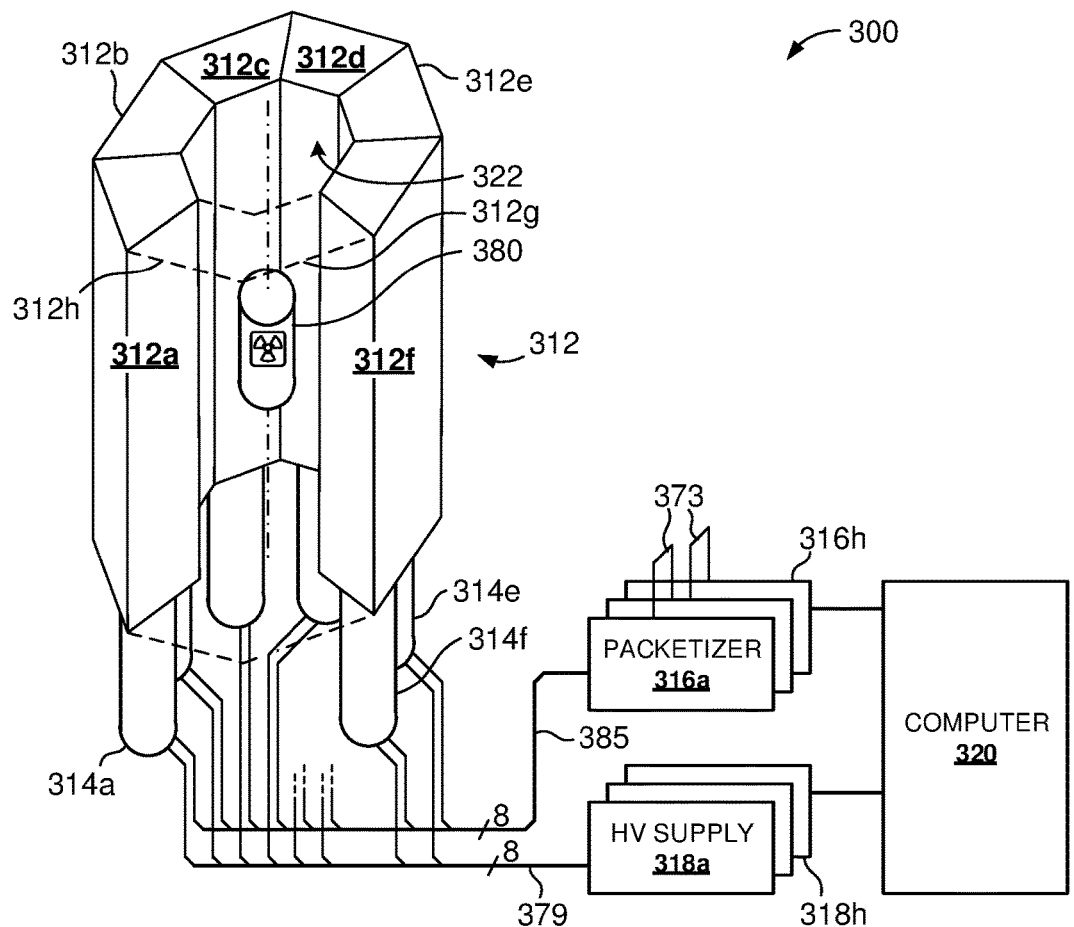
FIG. 3 is a schematic diagram of another embodiment of a micro-dose calibrator, portions of which are shown in phantom lines.

FIG. 3 is a schematic diagram 300 of another embodiment of a micro-dose calibrator according to the disclosed technology. A ring of eight scintillation detectors 312 is shown in cutaway view. Six detectors 312a-f are shown, while two detectors have been omitted from the diagram for clarity of illustration; their positions 312g-h are indicated by phantom lines. The illustration shows a sample 380 which is a container, such as a syringe, in which a radioactive micro-dose is present. The sample 380 is positioned within a sample chamber which is an interior space of a receptacle 322 formed by the inward facing surfaces of the scintillation detectors 312a-h. PMTs 314a-h are optically coupled to respective scintillation detectors (PMTs 314g-h are also omitted from the drawing). Radioactive decay events can cause gamma rays or x-rays to be deposited or scattered within the scintillation detectors; the energy deposited leads to electron excitation and subsequent de-excitation accompanied by light emission; some emitted light is optically coupled to respective PMTs. Within the PMTs, the received light leads to ejected electrons at a photocathode; the electrons are amplified along a high-voltage dynode chain, leading to an electrical pulse output for each detected scintillation event. The PMTs receive high voltage from computer-controlled high-voltage (HV) power supplies 318a-h over a group of high-voltage cables 379. The electrical signals from the PMTs are conveyed to respective packetizer channels 316a-h (e.g. on one or more packetizer boards) via a group of electrical cables 385, where the electrical signals are digitized, events are discriminated from noise, and digital event packets are produced. The digital event packets are conveyed over a high-speed fiber optic bus to a computer 320, where further processing is performed in software as described herein.

In an illustrative micro-dose calibrator, PMTs 314a-h can be Hamamatsu Model R1166 PMTs (Hamamatsu Photonics K. K., Hamamatsu City, Japan), HV power supplies 318a-h can be CAEN Model V6533M 6-channel HV power supply boards (CAEN S.p.A., Viareggio, Italy), and packetizers 316a-h can be implemented with at least one CAEN Model V1725D 8-channel digitizer board. The electronic counter for each scintillation detector can be implemented partly in a packetizer 316a-h and partly within computer 320. The electronic counters for two or more scintillation detectors can share some circuitry, while maintaining independent counting capabilities for respective detectors.

In some embodiments, an electronic counter can include a signal input from a light transducer, a discriminator, a time-tagger, a packetizer, and an accumulator. The accumulator is incremented by one for each event meeting predetermined criteria. Criteria can include the channel (that is, which scintillation detector), an energy filter, or a coincidence classification (singles, 2-way coincidence, 3-way coincidence, and so on). In further embodiments, the counting electronics includes at least one multi-channel analyzer, which can be implemented in any combination of hardware and software.

As shown in FIG. 3, the plurality of scintillation detectors are disposed in an annulus around the sample chamber. The plurality of scintillation detectors are also shown to have mutually complementary shapes and are disposed contiguously. As used herein, contiguous means adjacent; two contiguous detectors can be in contact or can be separated by a small gap. As used herein, complementary shapes are shapes that conform to one another, so that they can be placed in proximity with no gap, or a small and generally regular gap, separating them. The depicted scintillation detectors are also substantially the same size and shape. However, these features are not requirements, and other detector configurations can also be employed. The ring described above can be supplemented with one or more additional scintillation detectors to capture particles emitted towards the top or bottom surfaces of the sample chamber, thus forming a sample chamber as a closed-bottom well, a closed-top well, or a fully enclosed space, and increasing solid angle coverage. Substantial solid angle coverage can be obtained without requiring rotation of any portion of the apparatus, saving on support structures, mechanisms, and a drivetrain required for a rotating apparatus. In examples, one or both of bottom and top can be enclosed without use of separate scintillation detectors, by suitable design on the scintillation detectors defining the circumferential surface of the sample chamber. Scintillation detectors can also be deployed in the shape of a rectangular prism, or in shapes approximating a section of a spheroidal shell or a section of a cylindrical shell. Spheroidal coverage can be based on a polyhedral pattern, such as tetrahedral, cubical, dodecahedral, icosahedral, or soccer ball. Solid angle coverage can extend over at least a steradians (e.g. a hemisphere) about a center of the sample chamber. In embodiments, four to 100 scintillation detectors can be used. Deployment of opposed detectors, or detectors providing a high degree of solid angle coverage, can be helpful to maintain accuracy by reducing the sensitivity of a calibration to geometric variations. The geometric variations can include mis-positioning of a sample, or size effects due to variations in detection efficiency over the volume of a radioactive micro-dose.

For high detection efficiency, it is desirable to have good solid angle coverage for emissions from the sample chamber and, accordingly, small gaps between the scintillation detectors. The maximum gaps between adjacent scintillation detectors can be controlled, by design or positioning, to be less than or equal to a tolerance specification. In varying examples, the tolerance specification can be between 1 μm and 1 cm; for example 1 μm, 10 μm, 100 μm, 200 μm, 500 μm, 1 mm, 2 mm, 5 mm, or 1 cm.

The general design of the micro-dose calibrator shown in FIG. 3, with a long, narrow cylindrical sample chamber, has a detection efficiency which is insensitive to small variations in sample position. Accordingly, the detection efficiency is also insensitive to the sample volume. For samples of the same radioactivity concentration, measured correlated count rates are proportional to volume to a high degree of accuracy, a feature which is dubbed volumetric linearity. Other embodiments with sample chambers that are elongated (relative to any apertures) and symmetric also have good volumetric linearity.

A wide range of scintillator materials is known and suitable for use with disclosed micro-dose calibrators. Scintillator crystals can be based on, among other materials, $BaF_2$, BGO, $CdWO_4$, CsI, GSO, LSO, LYSO, NaI, YAP, or ZnS. Plastic scintillators can also be used. Scintillator crystals can incorporate a dopant, which can be Ag, Ce, Eu, or Tl. In some embodiments, scintillation detectors of Thallium-doped Sodium Iodide, NaI (Tl), are used.

Radioactive decay particles which are suitably measured in a disclosed micro-dose calibrator include photons having energy in a range 10 keV to 2 MeV, commonly 20 keV to 512 keV, 30 keV to 100 keV, or 100 keV to 200 keV. The working energy range of a micro-dose calibrator depends on the material and volume of a scintillation detector, and can extend down to 1 keV and below (e.g. for a cooled Germanium detector) or up to 10 MeV and above. Micro-dose calibrators as disclosed herein are suitable for measurement of other radioactive decay particle as well.

Figure 4:
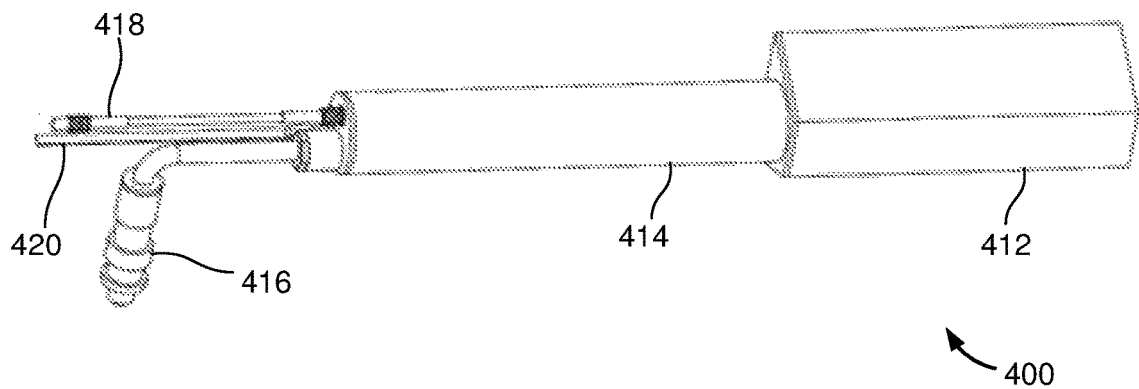
FIG. 4 is a perspective view of a subassembly of a disclosed micro-dose calibrator, including a scintillation detector and a photomultiplier tube.

FIG. 4 is a perspective view of a subassembly 400 of a micro-dose calibrator embodiment, including a scintillation detector 412 and a photomultiplier tube 414. Scintillation detector 412 can be, for example, one octant of the ring of scintillation detectors depicted in FIG. 3. Scintillation detector 412 can include an encasing opaque sheath, with an optical window that mates with a corresponding optical window of PMT 414. The opaque sheath prevents ambient light from being detected and can also prevent moisture-induced deterioration of the scintillator material. PMT 414 has connections 416, 418, and 420 for high-voltage input, electrical pulse output, and an earth ground connection, respectively.

Figure 5:
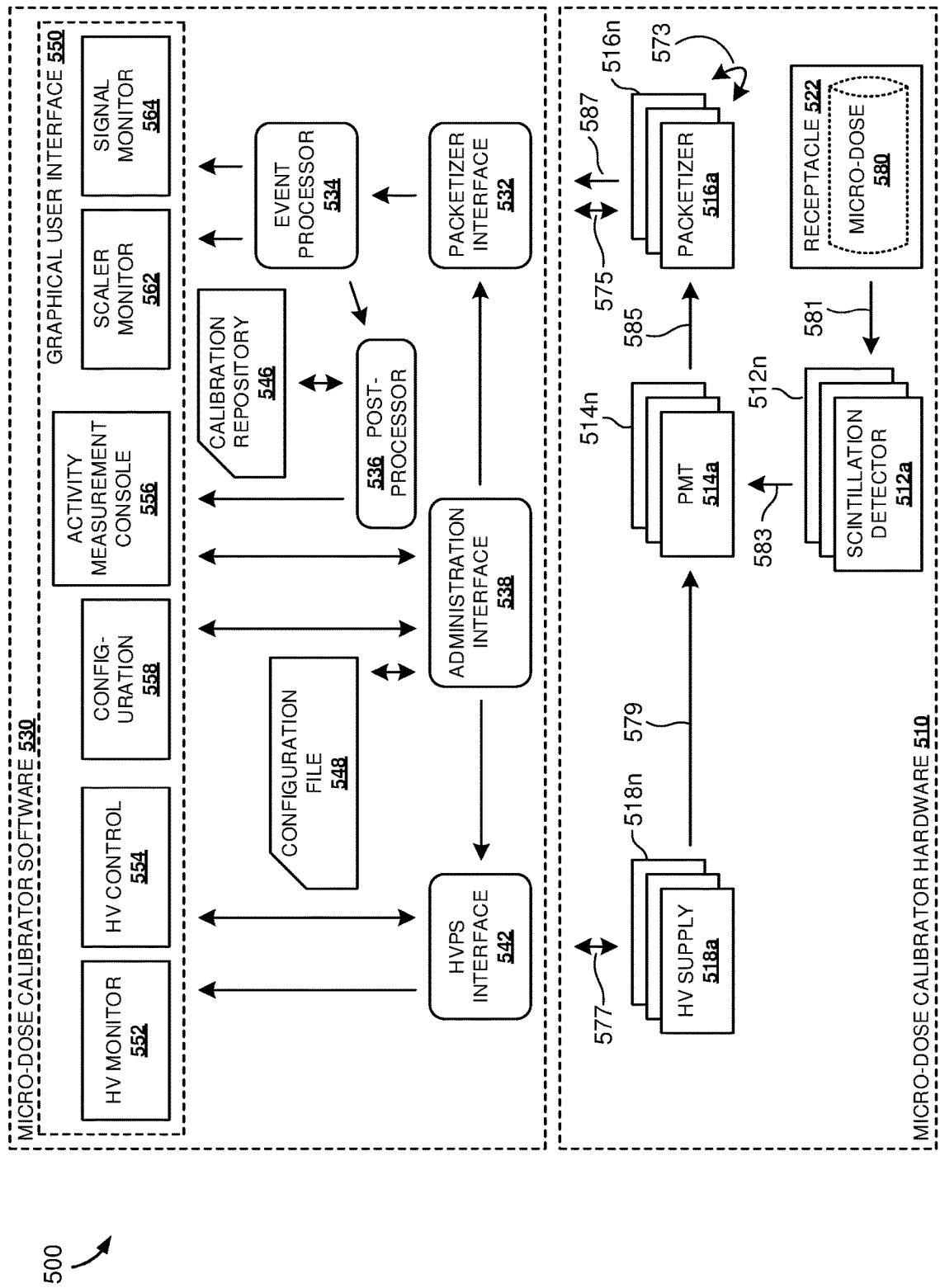
FIG. 5 is a block diagram of a further embodiment of a micro-dose calibrator.

FIG. 5 is a block diagram 500 of another embodiment of a micro-dose calibrator, incorporating hardware and software components. Software can be implemented in a computing system by executable instructions stored on computer-readable media, and executed by one or more processors with attached memory. Thus, software components are ultimately also realized in hardware components. Many realizations of a computing system are suitable for use as described herein.

Dashed outline 510 includes representations of hardware components of a micro-dose calibrator similar to those described above. Radioactive decays of a micro-dose 580 lead to emissions transmitted (arrow 581) toward an array of scintillation detectors 512a-n. Scintillation light generated within the scintillation detectors 512a-n is optically coupled (arrow 583) through windows to respective PMTs 514a-n. Each PMT is connected by a HV cable (arrow 579) to a respective HV power supply 518a-n from which it derives operational power. Electrical pulses representing detected particles are conveyed by electrical cable (arrow 585) from each PMT to a respective packetizer. The packetizers can have electrical or optical interconnections among themselves for sub-microsecond synchronization among the packetizers. Although shown symbolically as a single arrow 573, the synchronization can be a daisy chain of separate connections from one packetizer to the next, or a single multi-drop shared medium connection, or a star topology from a master packetizer to slave packetizers, or another topology.

Micro-dose calibrator software 530 is depicted within another dashed outline, and includes graphical user interface 550 as well as other components. The graphical user interface 550 is readily understood in terms of display screens, however one of ordinary skill will recognize that underlying each screen are software components to store, retrieve, and display the items shown on that screen and, in some instances, accept interactive user inputs associated with screen objects, and decode and forward these inputs in accordance with the programming underlying each screen. Display screens can be rendered on a display, and the assorted software components are implemented by instructions stored in and executed by hardware components. One of ordinary skill will also recognize that any of the screens depicted can be combined, split, or otherwise reorganized within the scope of this disclosure.

Packetizer interface 532 is connected to packetizers 516a-n over a high-speed connection, which can be a fiber-optic link. Detected event packets are transmitted from packetizers 516a-n to packetizer interface 532 (arrow 587), while control and status information is exchanged bidirectionally (arrow 575). In some embodiments both traffic 575, 587 are conveyed over the same connection, while in other embodiments, separate connections can be used. The packetizer interface 532 can forward event packets to event processor 534, which performs coincidence processing to determine a correlated event rate. Event processor 534 can drive monitor screens such as scaler monitor 562 and signal monitor 564. Signal monitor 564 can display representative time-signatures of detected events, or energy spectra, for all or selected ones of the scintillation detectors 512a-n. Scaler monitor 532 can display raw and processed rates for individual detectors 512, as well as various coincidence rates and a correlated event rate.

The event processor 534 forwards the correlated event rate to post-processor 536 which applies a basic calibration factor and optionally one or more high-rate corrections to the correlated event rate, to determine the radioactivity level of the micro-dose sample 580. The basic calibration factor accounts for geometric efficiency (solid angle coverage and particles lost due to detector thinness) and units conversion. High-rate corrections can include deadtime corrections, pileup, and randoms correction, which are all manifestations of multiple events detected within a single detector at near enough times as to be unresolvable. Additionally, a low-rate correction can be applied to subtract out a background rate (natural proximate radioactivity or cosmic rays). Post-processor 536 accesses calibration or correction parameters from a calibration repository 546, and reports determined radioactivity levels on activity measurement console 556.

Administration interface 538 provides central software management functions, accessing a configuration file 548, displaying a configuration screen 558 and obtaining interactive user input for fields on the configuration screen 558. Administration interface 538 also displays the activity measurement console 556 and obtains further interactive inputs, including a "begin measurement" command, from the console 556. Responsive to a "begin measurement" command, the administration interface provides sequenced control commands to the packetizer interface 532 and to a high-voltage power supply (HVPS) interface 542.

The HVPS interface 542 controls HV supplies 518a-n during micro-dose calibration measurements. HVPS interface 542 presents an HV control screen 554 and obtains interactive user input for fields displayed on this screen. HVPS interface 542 also displays an HV monitor screen indicating settings, status, or operating parameters to the HV supplies 518a-n.

One of ordinary skill will appreciate that the block diagram of FIG. 5 is illustrative and that many variations are possible within the scope of this disclosure. In examples, some or all event processor 534 functionality can be pushed down into packetizers 516a-n, or some or all packetizer functionality can be implemented within software 530. Light transducers other than PMTs can be used, such as SiPMs, requiring no HV supplies or supporting software modules. Software 530 can also provide additional functions, such as for PMT voltage tuning or SiPM bias voltage tuning, or establishment of a deadtime correction model, as disclosed herein. Some or all software screens can be replaced by a network API (application programming interface) for remote control of the apparatus. Whether over a network API or on local screens, graphical user interface 550 can be implemented in a web browser.

Figure 6:
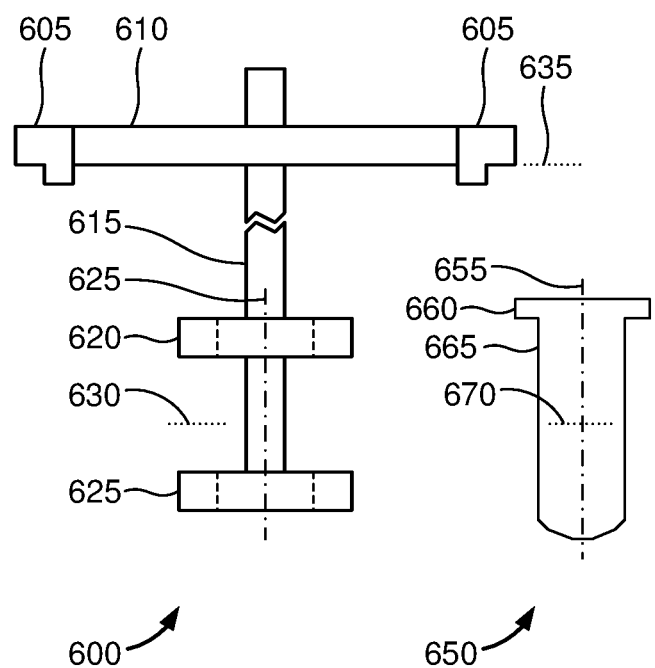
FIG. 6 is an elevation view of an embodiment of a sample holder, also showing an elevation view of a compatible sample container.

FIG. 6 is an elevation view of an embodiment of a sample holder 600, also showing an elevation view of a sample container 650 suitable to be held by the sample holder 600. Sample holder 600 retains a sample or sample container (such as container 650) in a fixed pre-selected position within a sample chamber. Shoulders 605 are formed to fit the receptacle of a micro-dose calibrator. Features on shoulders 605 are designed to fit features of the receptacle so that consistent, reproducible placement of sample holder 600 is obtained with respect to the receptacle, the sample chamber, and the scintillation detector array of a micro-dose calibrator. As illustrated, the shoulder pieces have downward facing rabbets which can fit the extent of a receptacle edge to prevent sliding or torsional motion. In variants, fittings or fasteners on the receptacle can be provided to mate with holder features to form, for example, a tongue-in-groove. Snap fittings, screw fittings, hook-and-loop, or other fasteners can be provided as are known in the art. In examples the fit of the sample holder 600 into the micro-dose calibrator receptacle can be reproducible to within a tolerance of 1 mm, or another limit in a range 0.1 mm to 3 mm.

Shoulders 605 and a central post 615 are joined by beam 610. Retainers 620 and 630 are mounted on central post 615 and provide constrained positioning for a sample container such as vial 650. As illustrated, retainer 620 is a ring sized for a slip fit around a body 665 of vial 650 and providing a seat for cap or head 660 of vial 650. Retainer 630 is another slip-fit ring that constrains the position of vial 650 against tilt. In variations, spring clips, clamps, suction, magnetic, electrostatic, or another fastener can be deployed for one or both of retainers 620, 630. By suitable design, the centerline 625 of retainers 620, 630 can be aligned with both a centerline of the sample chamber and the centerline 655 of vial 650, thus providing reproducible positioning of sample 650 at a central location of the sample chamber. Additionally, by suitable design of sample holder 600, the horizontal plane 630, shown by dotted line, can be aligned with the horizontal mid-plane of the sample chamber, and also aligned with midplane 660 of the sample vial 650, so that the centroid of a radioactive dose can be reproducibly positioned at the centroid of the sample volume.

Similar sample holders can be provided for a variety of available vials, syringes, or other sample containers. To minimize photon absorption by the sample holder 600, it can be desirable to have a low-mass sample holder fabricated, at least in the vicinity of the held sample container, of low-Z materials. A non-exclusive list of suitable materials includes organic compounds (acrylonitrile butadiene styrene (ABS), poly-lactic acid (PLA), polyamide (e.g. nylon), epoxy resins, photopolymers, or polycarbonate), carbon allotropes (graphite, graphene, carbon fiber), aluminum, and composite materials containing one or more low-Z materials.

Sample container 650 stores a radioactive sample, which can be in the form of solid, powder, liquid, solution, gas, or biological tissue.

Figure 7:
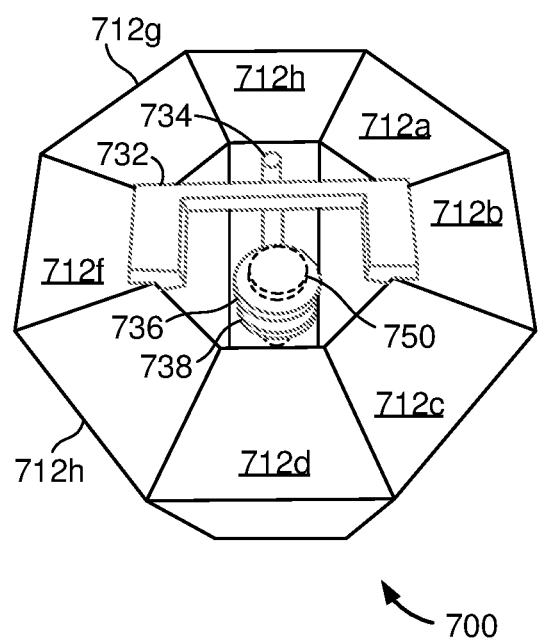
FIG. 7 is a top perspective view of the sample holder of FIG. 6 retaining a sample container and positioned in a receptacle of a disclosed micro-dose calibrator.

FIG. 7 is a top perspective view of an assembly 700 showing a sample holder similar to that of FIG. 6 retaining a sample container 722 and positioned in a receptacle of a micro-dose calibrator. For clarity of illustration further components of the micro-dose calibrator are omitted from FIG. 7. Scintillation detectors 712*a-h* are arranged in a ring to form a receptacle and enclose a sample chamber. A sample holder having beam 732, post 734 and rings 736, 738 is shown seated in the receptacle of the micro-dose calibrator. Although not part of the micro-dose calibrator, a sample container 750 is shown for illustrative purposes, in dotted outline.

Figure 26:
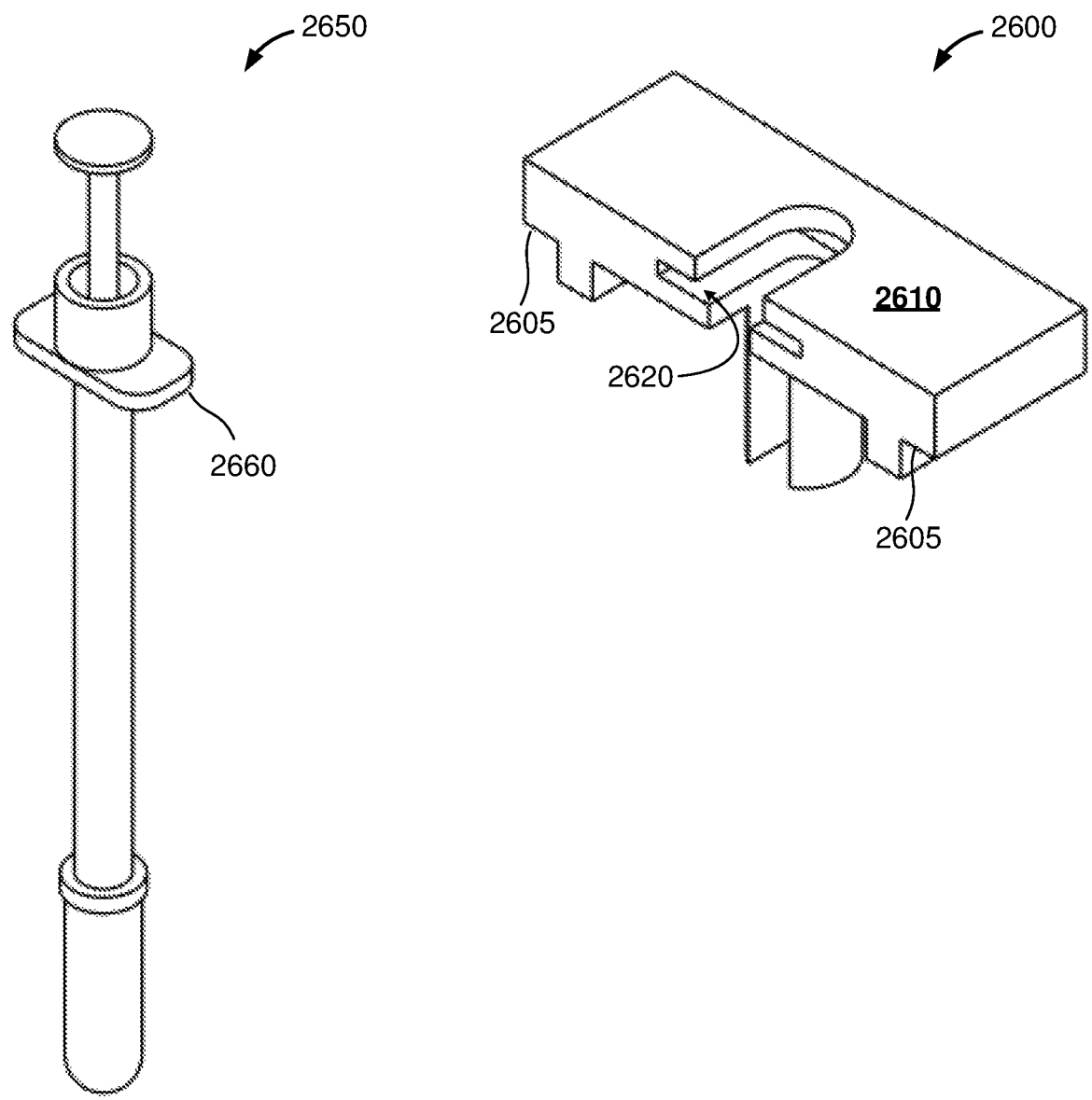
FIG. 26 is a perspective view of an embodiment of a syringe holder, also showing a perspective view of a compatible syringe.

The sample holder 600 is suitable for a vial 650 which can be inserted from above into the sample holder 600. However, other sample containers such as syringes (which can have a wide safety cap over the needle) can require a side-entry sample holder. FIG. 26 shows a perspective view of an embodiment of a side entry syringe holder 2600. Shoulders 2605 on beam 2610 provide reproducible positioning of sample holder 2600 relative to the receptacle of a micro-dose calibrator. Slot 2620 provides side entry for tab 2660 of a syringe 2650, thereby providing reproducible positioning of syringe 2650 within a sample chamber.

FIGS. 27-28 show perspective views of additional sample holders 2701, 2801, shown positioned in sample chambers of respective micro-dose calibrators 2700, 2800. In FIG. 27, sample holder 2701 features a beam 2710 with shoulders 2705, for seating with a receptacle cover plate 2760, and an elongated recess 2715 within which syringe 2750 can be seated for reproducible positioning. In FIG. 28, sample holder 2801 features a beam 2810 with shoulders, similar to sample holder 2600. Vial 2850 is retained within sample holder 2801 by a thin base 2830 and a ring 2820, the inner diameter of which is sized to provide a slip fit for vial 2850. Aperture 2815 in beam 2810 allows insertion and removal of the vial 2850. The dimensions and features of sample holders described herein can be adapted to accommodate other forms of sample containers, such as test tubes or vials. Glass vials or test tubes can be used to calibrate radioactivity of tissue samples.

FIGS. 27-28 also show certain common features of micro-dose calibrators 2700, 2800, shown in cutaway partial view. For simplicity of illustration, only a single scintillation detector 2770 is shown; it will be understood that additional scintillation detectors can be disposed to form a ring about central axis 2755. Scintillation detector 2770 is mounted on a base plate 2762; a PMT 2773 is coupled to the scintillation detector 2770 through a hole in the base plate 2762. Surrounding the ring of scintillation detectors (only detector 2770 is shown) is a side wall 2764. A cap 2766 is placed over the sample holder mounting. In the depicted embodiments, lead shielding 2780 is provided conforming to the side wall 2764, the cover 2760, and the cap 2766. Such lead shielding, integrated into the design of a micro-dose calibrator serves to protect against scattered X-rays or gamma rays from a ceiling or other nearby object, and can be relatively thin, from about 1 mm to about 6 mm in varying embodiments. Additional thicker lead shielding (in examples, about 5 cm thick) separate from the micro-dose calibrator can be provided around the micro-dose calibrator to protect against direct background sources of radiation.

In variations, an adjustable stage can be included in a micro-dose calibrator, and can be used to position a centroid of a micro-dose at a centroid of the array of scintillation detectors, or at another desired position. The adjustable stage can be computer-controlled, with feedback from a count rate, operable to adjust a sample position in the vertical direction or a transverse direction so as to maximize the count rate and/or minimize an imbalance between detector count rates. The best geometric efficiency may not be at the centroid of the scintillation detectors or at the centroid of a sample chamber. For example, geometric efficiency of a closed-bottom well configuration can be maximized on the bottom surface of the well, and the desired position could be in the center of the bottom surface, or in a corner.

In another variation, a shield can be deployed around the sample but within the sample chamber, to attenuate the gamma-ray or X-ray flux prior to detection by the micro-dose calibrator. Thereby, the dynamic range of the micro-dose calibrator can be extended to higher radioactive decay rates. The shape of the shield can be similar to that of the detector array, e.g. a long annular cylinder in the case of an annular ring of detectors as shown in FIG. 3, or a cup in the case of a closed-bottom micro-dose calibrator described further below. The shield can be made of lead or another gamma-ray or X-ray absorbing material. The shield thickness can range from about 1/64" (about 0.4 mm) for shielding of X-rays to about 1/4" (about 6 mm) for shielding 511 keV gamma rays, or can be of an even greater thickness where dose activity level or photon energy is particularly high. The shield can be fabricated as a liner conforming to the inner surfaces of the detector array or to the outer surfaces of a sample chamber such as sample chamber 220. In other embodiments, the shield can be fabricated as a sheath affixed to a sample holder such as sample holder 600, surrounding a sample. A set of multiple shields of varying thicknesses can be provided to extend the useful operating range of the micro-dose calibrator.

EXAMPLE 2

Closed-Bottom Segmented Micro-Dose Calibrator

Figure 8:
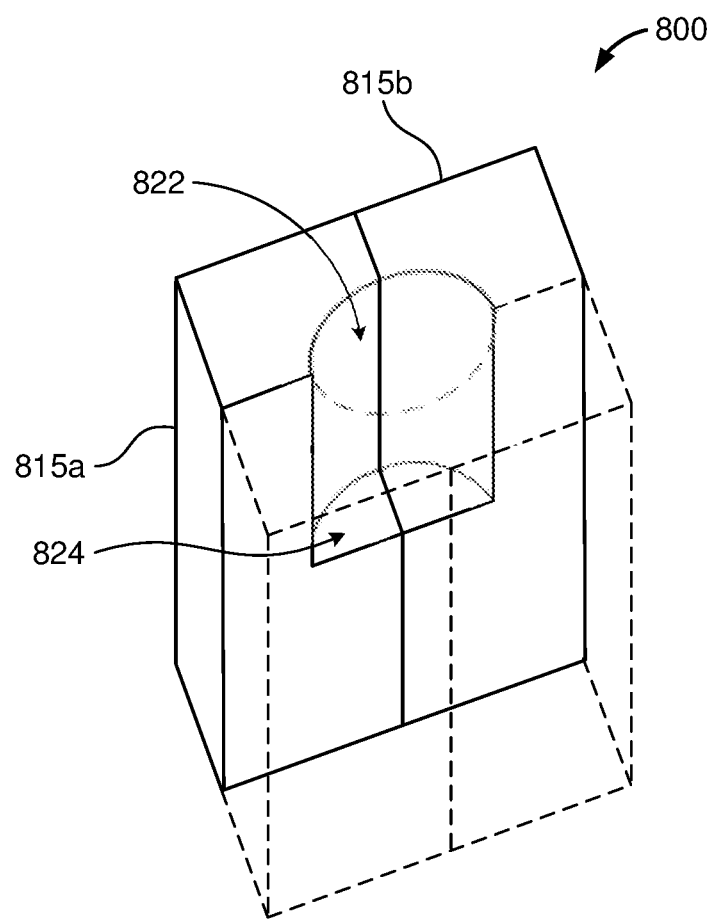
FIG. 8 is a perspective view of a segmented well calibrator having an arrangement of scintillation detectors forming a closed-bottom well, portions being shown in phantom lines.

FIGS. 2-3 depict arrays of scintillator detectors which can have a ring-like configuration with open top and bottom. However, this is not a requirement, and in order to achieve greater solid angle coverage, arrays of scintillation detectors can be arranged to form a well or sample chamber having closed bottom and/or top. FIG. 8 shows one such arrangement.

FIG. 8 is a perspective view of micro-dose calibrator having an arrangement of scintillation detectors forming a closed-bottom well. The illustrated embodiment has four scintillation detectors 815a-d of which only two detectors 815a-b are shown for clarity of illustration; phantom lines indicate the position of detectors 815c-d. The array of scintillation detectors 815a-d form a well 822 having a bottom surface 824 formed by a step portion of each detector, and a circumferential surface formed by the inner curved surfaces of detectors 815a-d.

Other arrangements are possible. For example, one or more additional scintillation detectors can be added to a ring configuration to provide solid angle coverage at the bottom and/or top surfaces of a sample chamber. A micro-dose calibrator having closed top and bottom also offers superior volumetric linearity as described herein. Alternate configurations include an array of five or six square-faced detectors aligned with five or six faces of a cube; an array of pentagonal or circular detectors oriented as six to 12 faces of a dodecahedron; and other configurations.

In some embodiments, all scintillation detectors have a same size or shape, while in other embodiments, the detectors defining the circumferential surface of the well are a same size and shape, and a detector defining the bottom surface of the well is not the same size and shape as the circumferential detectors.

In further embodiments, a micro-dose calibrator having a closed-bottom well can have additional features, such as an array of photodetectors coupled to respective scintillation detectors, a plurality of electronic counters electrically coupled to the photodetectors and operable to count detected radioactive decay particles independently for each detector, a holder configured to retain a sample or sample container within the well, or an additional independent scintillation detector positioned above the well and defining a top surface of the well.

EXAMPLE 3

Operational Method of a Micro-Dose Calibrator

Figure 9:
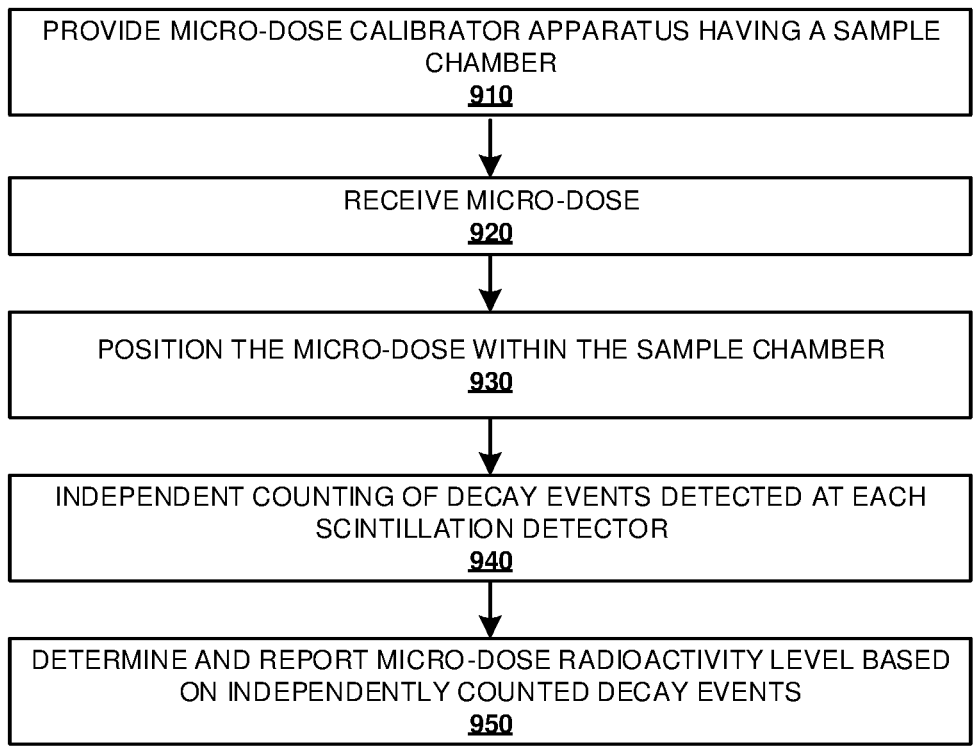
FIG. 9 is a flowchart of an exemplary method for calibrating a micro-dose using a disclosed micro-dose calibrator.

This example illustrates an operational method by which a disclosed micro-dose calibrator makes a determination of the radioactivity level of a micro-dose sample. FIG. 9 is a flowchart of an exemplary method for calibrating a micro-dose according to the disclosed technology. At process block 910, a micro-dose calibrator as described herein is provided, which can be an open-ended design similar to that shown in FIG. 3, or a closed-bottom segmented well detector similar to that of FIG. 8. The micro-dose calibrator has a plurality of scintillation detectors and a sample chamber. At process block 920, the micro-dose is received, and the micro-dose is positioned within the sample chamber at process block 930. At process block 940, micro-dose decay events detected by each scintillation are independently counted. Finally, at process block 950, a radioactivity level of the micro-dose, determined from the independently counted micro-dose decay events, is displayed on a screen, transmitted over a network, otherwise reported, or stored.

In further examples, the received micro-dose comprises a radioactive isotope which can be a positron-emitter or a gamma-emitter having a gamma-ray energy within the detection range of the micro-dose calibrator; exemplary isotopes include Fluorine-18, Copper-64, Gallium-68, Bromine-76, Zirconium-89, Technetium-99m, Indium-111, or Iodine-125. The micro-dose can be received in the form of an applicator, such as a syringe or vial, as a storage container, as a tissue sample, or as a live animal. In this disclosure, tissue harvested from a sacrificed animal, the whole sacrificed animal, or a plant part is considered to be a tissue sample. Positioning the micro-dose at process block 930 can include positioning the micro-dose within a sample holder, positioning the micro-dose at a central location of the sample chamber, positioning the micro-dose at a location within the sample chamber which substantially maximizes the geometric efficiency, positioning the sample holder within the sample chamber, or aligning a centroid of the micro-dose with an optimum location in the sample chamber, which can be the center of the sample chamber. In some examples, substantial maximization can be within about 5% of a true maximum, while in other examples, the substantial maximization can be within 1%, 2%, or 10% of a true maximum. Additionally, the micro-dose can be positioned at a central location which substantially minimizes an imbalance between a plurality of the detectors arranged around the micro-dose. In some examples, substantial minimization can be within about 5% of an average count rate of the plurality of detectors, while in other examples, the substantial minimization can be within 1%, 2%, or 10% of the average count rate. In some examples, the central location can be within a transverse distance from a geometric center of the sample chamber, wherein the transverse distance can be 1 cm, or in a range from 0.1 mm to 2 cm. In some examples, the central location can be within a longitudinal distance from a geometric center of the sample chamber, wherein the longitudinal distance can be 1 cm, or in a range from 0.1 mm to 2 cm.

The detected events can include 25-99.9% of the radioactive decay events of the micro-dose; in varying embodiments, the detection efficiency can be at least 30%, at least 40%, at least 50%, at least 60%, at least 70%, at least 80%, or at least 90%. The detection efficiency can be specified for a particular nuclide, or for photons within an energy range. In varying examples, energy ranges 20-511 keV, 30-100 keV, 200-511 keV, or 100-200 keV can be used, or any range within 10 keV-2 MeV, or within 1 keV-10 MeV. In examples, a method according to FIG. 9 can provide a micro-dose activity measurement in the range 10 nCi to 10 μCi inclusive with an error not exceeding 1%. In examples, a method according to FIG. 9 can provide an accuracy of 1% or better for any of a list of radioactive nuclides at any activity level in the range 10 nCi to 10 μCi inclusive, or 10 nCi to 100 μCi inclusive, wherein the list of radioactive nuclides can include all or any subset of nuclides disclosed herein. Limits on maximum error can range from 0.01% to 10%, for example 0.01%, 0.03%, 0.1%, 0.3%, 1%, 3%, or 10%.

In additional examples, process block 940 can include time-tagging detected micro-dose decay events, and the method can further include coincidence processing of the time-tagged events to determine a correlated event rate, and determining the micro-dose radioactivity level based on the correlated event rate. For accurate coincidence processing, the independent counting over the plurality of scintillation detectors can be synchronized. Synchronization can limit the time-tag mismatch between detectors to not exceeding a tolerance, which can be in the range 10 ps to 10 μs, for example 10 ps, 30 ps, 100 ps, 1 ns, 3 ns, 10 ns, 30 ns, 100 ns, 300 ns, 1 μs, 3 μs, or 10 μs. In some embodiments, the synchronization between counters can be 1-2 ns, which is small compared to a timing resolution of 7-10 ns for NaI scintillation detectors and a coincidence time window of about 30-60 ns. Further, process block 950 can include one or more of applying a deadtime correction, applying a randoms correction, or applying a basic calibration factor, as described herein.

Figure 10:
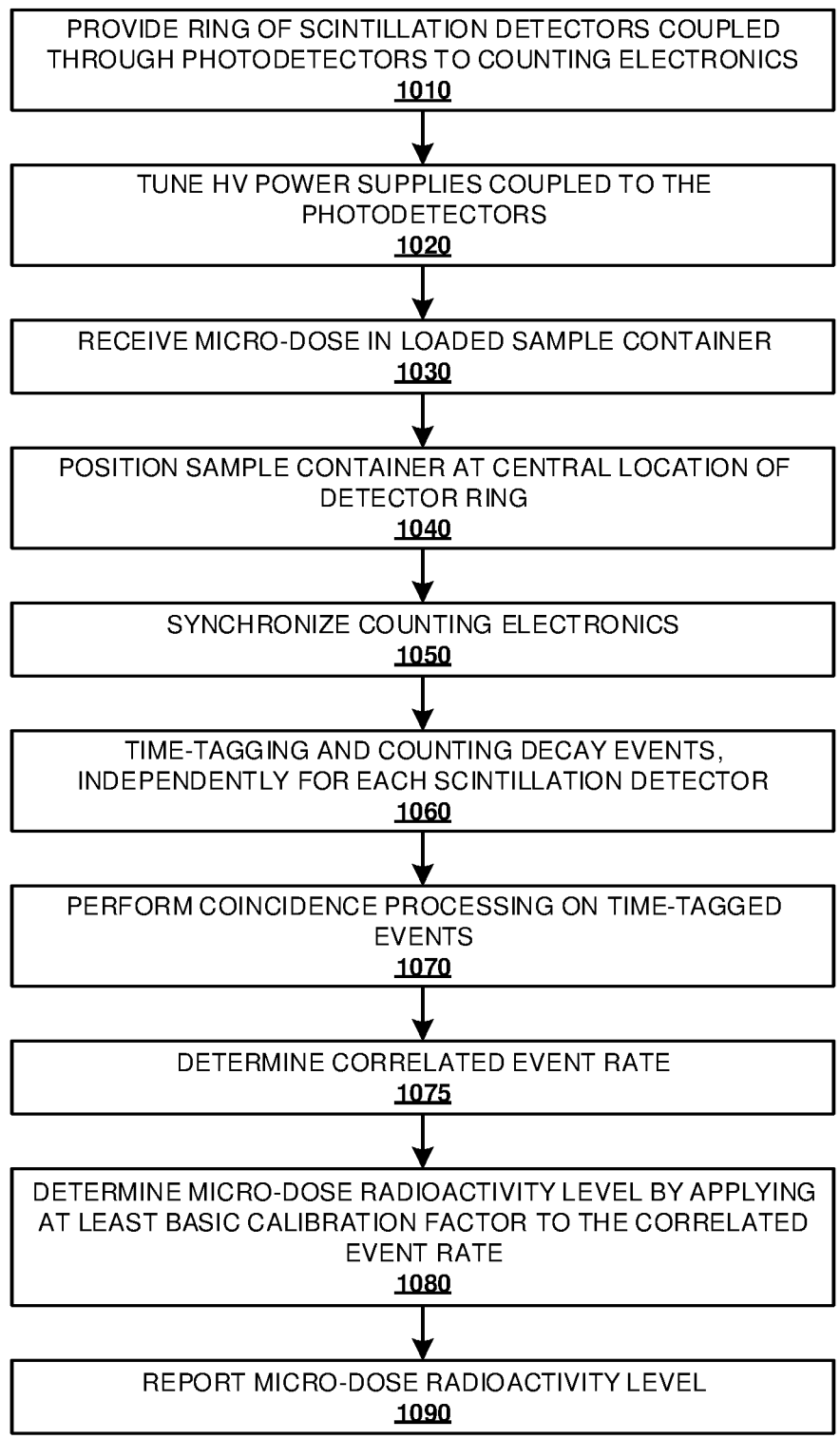
FIG. 10 is a flowchart of another method for calibrating a micro-dose.

FIG. 10 illustrates another example method for calibrating a micro-dose. Although aspects of FIGS. 9-10 can be combined in various ways in a single embodiment, one of ordinary skill will appreciate that each drawing stands on its own and does not imply any of the features shown or described for the other figure.

At process block 1010, a calibration apparatus is provided, having a ring of scintillation detectors coupled by respective photodetectors to counting electronics. Features of these components have been described herein. At process block 1020, HV power supplies, coupled to and powering the photodetectors, are tuned. Tuning can include adjusting the high-voltage outputs to the photodetectors so that the photodetector outputs are matched to a reference or to one another, within a predetermined tolerance. The tolerance can be specified in energy bins of a multi-channel analyzer, and can be in the range 0.1 to 10 bins, for example 1 bin tolerance on the photopeak position of a gamma ray of a particular nuclide. The micro-dose is received in a loaded sample container at process block 1030. At process block 1040, the sample container is positioned at a central location of the ring of scintillation detectors. The counting electronics are synchronized at process block 1050. At process block 1060, decay events detected by the scintillation detectors are time-tagged and counted, independently for each scintillation detector. At process block 1070, coincidence processing of the time-tagged events is performed. From the coincidence processing, a correlated event rate is determined at process block 1075. The micro-dose radioactivity level is determined at process block 1080, by applying at least a basic calibration factor to the correlated event rate. Then, at process block 1090, the determined level of micro-dose radioactivity is reported. Reporting can be on a digital display, on a GUI screen, over an API, to a stored file, or in another way.

In some examples, the determination of micro-dose radioactivity at process block 1080 can include applying a deadtime correction.

FIGS. 11-21 illustrate additional aspects of a calibration method that can be incorporated in some embodiments.

Basic Calibration

The correlated event rate is directly proportional to the micro-dose radioactivity level. The constant of proportionality, which can be expressed in units of the form radioactivity units per Hz, is the basic calibration factor. The basic calibration factor accounts for the definition of the desired radioactivity unit, and for efficiency. For example, the microcurie is defined as $3.7 \times 10^4$ decays per second. Thus the microcurie has a unit conversion factor $U = 1$ μCi/$3.7 \times 10^4$ Hz. The detector efficiency accounts for various losses, such as solid angle coverage, capture efficiency, and other losses. To illustrate, an exemplary detector could have a solid angle coverage of $75\% \times 4\pi$, meaning that 25% of decay particles are emitted in directions where there is no scintillation detector, yielding a geometric efficiency $G = 0.75$. An exemplary detector could capture only 60% of entering decay particles, meaning that 40% pass through without interaction, yielding a detection efficiency $D = 0.6$. An exemplary detector could have 0.2% of decay particles lost within the micro-dose sample, the sample container, or the sample holder, yielding another efficiency factor $H = 0.998$. With these numbers the overall detector efficiency is $E = G \cdot D \cdot H = (0.750)(0.600)(0.998) = 0.449$ to 3 significant figures. Then, the basic calibration factor is $B = U/E$. For the present illustration, $B = (1/3.7 \times 10^4)/(0.449)$ μCi/Hz $= 6.02 \times 10^{-5}$ μCi/Hz. Factors such as D or H can be dependent on the energy and type of decay particle, and thus can vary between radioactive nuclides. Factors G or H can vary dependent on the form factor of the micro-dose sample, and can involve values averaged over the sample volume.

Figure 11:
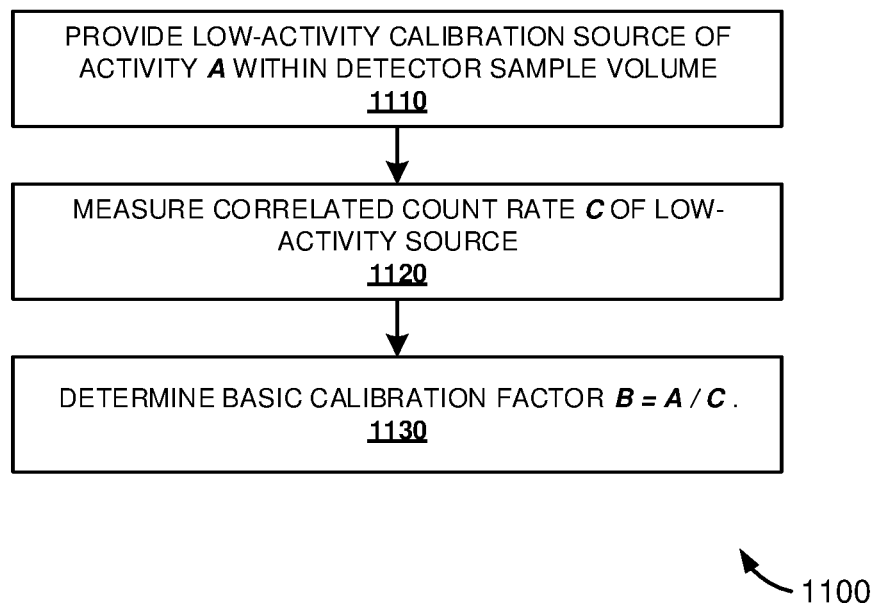
FIG. 11 is a flowchart of a method for determining a basic calibration factor for a disclosed micro-dose calibrator.

FIG. 11 is a flowchart 1100 of a method for determining the basic calibration factor for a micro-dose calibrator. At process block 1110, a calibration source of activity A is provided within the sample chamber of the micro-dose calibrator. The activity A can be low enough that deadtime and other high-rate corrections are insignificant relative to the desired accuracy. At process block 1120, the correlated count rate C for the calibration source is determined by measurement. Then, at process block 1130, the basic calibration factor is determined as $B = A/C$. Depending on the desired accuracy and particular rates, $C' = C - Bkgd$ can be used in place of C, where Bkgd is the background count rate, without any source present in the sample chamber.

Because of various factors affecting the efficiency, in some examples the calibration source is chosen to have a form factor (e.g. size, medium, and/or container) and/or nuclide that match the micro-dose sample to be measured. In other examples, the basic calibration factor can be adjusted to account for differences between the calibration source and the micro-dose sample.

Coincidence Processing

FIGS. 12A-12F are diagrams illustrating a coincidence processing method, for an exemplary micro-dose calibrator having four detectors. The detectors have respective event streams 1210, 1220, 1230, 1240 and respective stream pointers 1201-1204. For purposes of illustration, four events are shown in each stream having timestamp values T1-T4 as indicated. For example, the first event in stream 1210 has a timestamp of 3. Within each stream, the events are in chronological order. FIGS. 12A-12F show the configuration of this example evolving during the coincidence processing method. In this example, the width of the coincidence window is taken to be 2, meaning that two events having timestamps separated by 0, 1, or 2 units will be considered to be in coincidence. Lines joining pointers to streams indicate which stream event a pointer is currently pointing to.

Figure 12A:
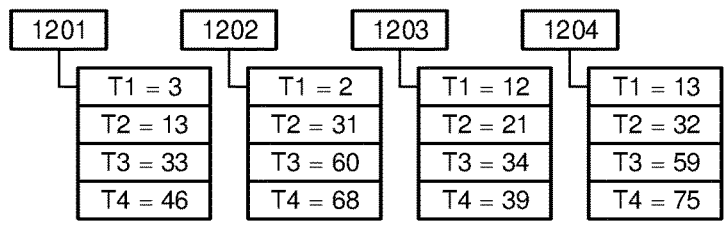
FIGS. 12A-12F are diagrams illustrating a coincidence processing method.
Figure 12B:
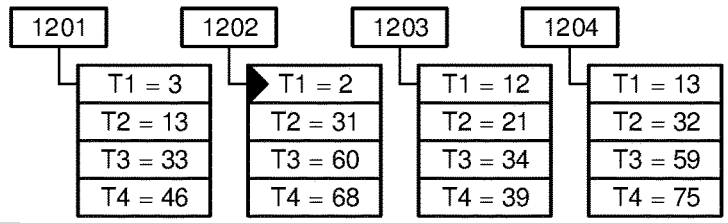
Figure 12C:
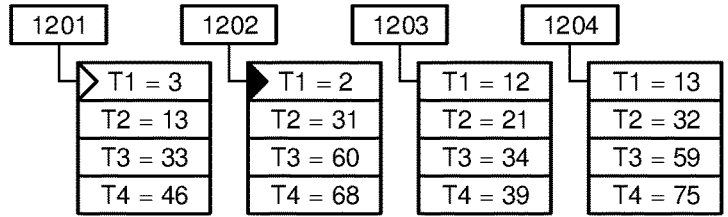
Figure 12D:
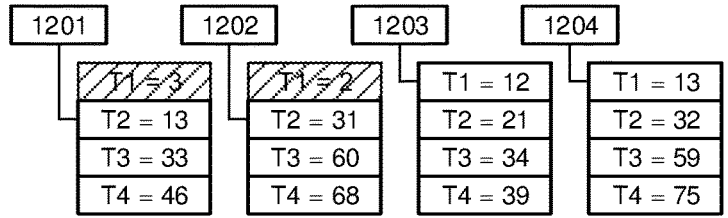

FIG. 12A shows an initial configuration, with all pointers pointing to the earliest events in the respective streams. Then, these pointed-to events are compared, and the event with timestamp 2 in stream 1220 is determined to be the earliest event, as indicated by the solid triangle in FIG. 12B. Then the remaining pointed-to events are compared with timestamp 2 to see if they are coincident with the T1=2 event. The timestamp 3 event in stream 1210 is coincident, while the pointed-to events in streams 1230, 1240 are not. Because the events are processed in chronological order, only the leading event in a stream is considered at any point in the method. The coincident event T1=3 is shown marked with an open triangle in FIG. 12C. With a 2-way coincidence event determined, a two-way coincidence counter is incremented by one, and the T1=2 and T1=3 events are removed from the respective streams, as indicated by shading in FIG. 12D. The pointers 1201, 1202 are also advanced to point to the next events in their respective streams.

Figure 12E:
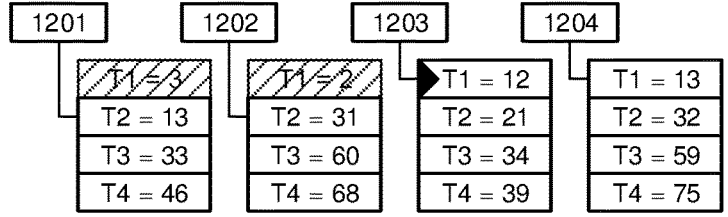
Figure 12F:
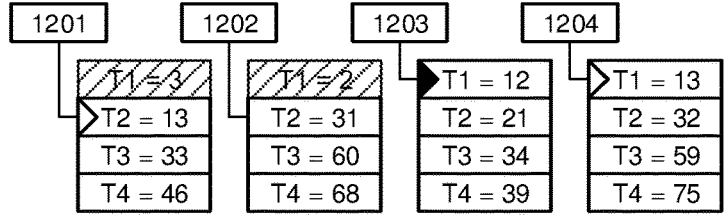

The procedure repeats, and the event with timestamp 12 in stream 1230 is found to be the earliest current event, as shown by solid triangle in FIG. 12E. Finally, FIG. 12F shows that two events with timestamp 13 (marked with open triangle) are in coincidence with primary event T1=12. These coincident events and their primary event form a 3-way coincidence; these events will be removed from their respective streams, and the 3-way coincidence counter will be incremented by one.

Subsequently, the coincidence processing method will identify another 3-way coincidence from events with timestamps 31, 32, 33 and a two-way coincidence event from events with timestamps 59, 60. However, the event T3=34 is outside the coincidence window of primary event T2=31; once the events 31, 32, 33 are removed from their respective streams, there is no longer a primary event for T3=34 to be coincident with, and T3=34 will be detected as a single. The remaining events T2=21, T4=39, T4=46, T4=68, and T4=75 will also remain as singles events.

One of ordinary skill will recognize that this example is merely an illustration, and that many more events, over a wider range of timestamps, for varying numbers of scintillation detectors can be handled similarly.

Voltage Tuning

Voltage tuning refers to a process of matching energy scales between PMTs by individually adjusting their operating voltages. By equalizing discrimination thresholds and sensitivities between detectors, voltage tuning provides better measurement reproducibility over the lifetime of a micro-dose calibrator and between micro-dose calibrators. Because decay particle energies vary between nuclides, and event processing is at least weakly energy dependent, voltage tuning also enables calibration source measurements to be accurately extrapolated from one nuclide to another.

FIGS. 13-16 illustrate the problem and solution.

Figure 13:
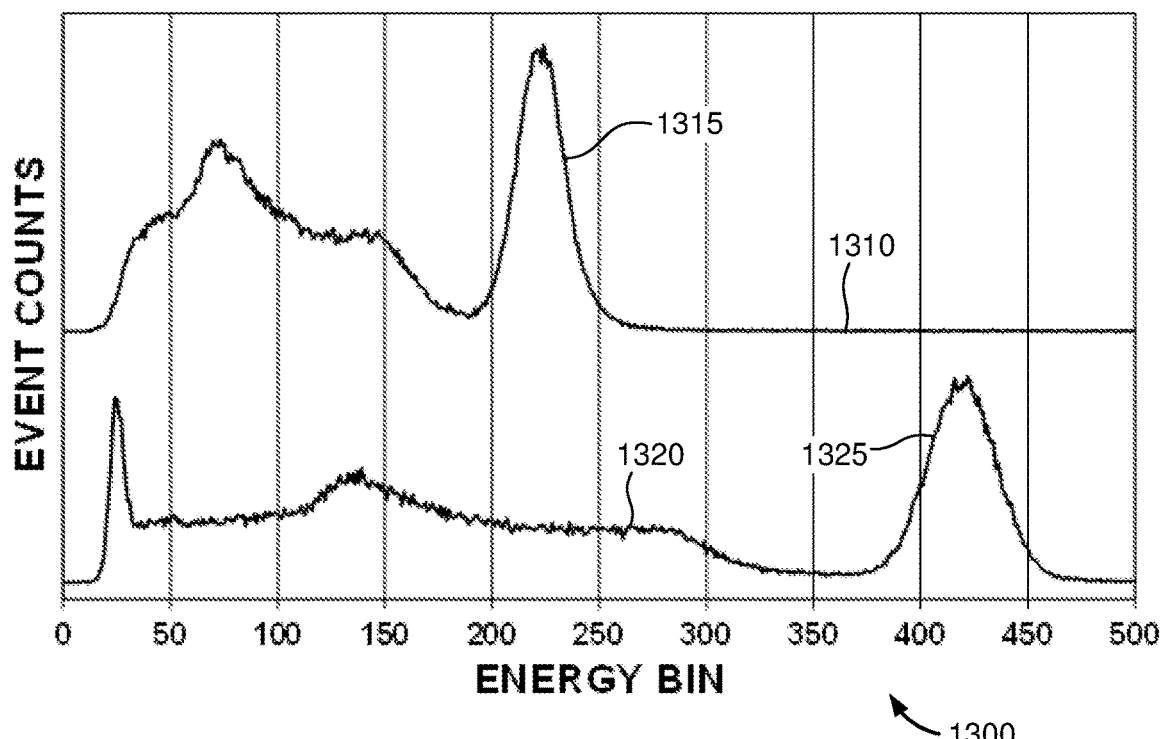
FIG. 13 is a graph illustrating energy spectra obtained with untuned PMTs.

FIG. 13 is a graph 1300 illustrating energy spectra 1310, 1320 of two untuned PMTs. The energy is plotted on the horizontal axis in units of energy bins, and the event counts (or rates) are plotted on the vertical axis; a vertical offset is applied between the spectra for convenience of illustration. Both PMTs are exposed to the same radioactive nuclide and should have identical spectra, however because of differences in gain, the photopeaks 1315, 1325 (representing ~100% collection of gamma ray energy) are considerably shifted.

Figure 14:
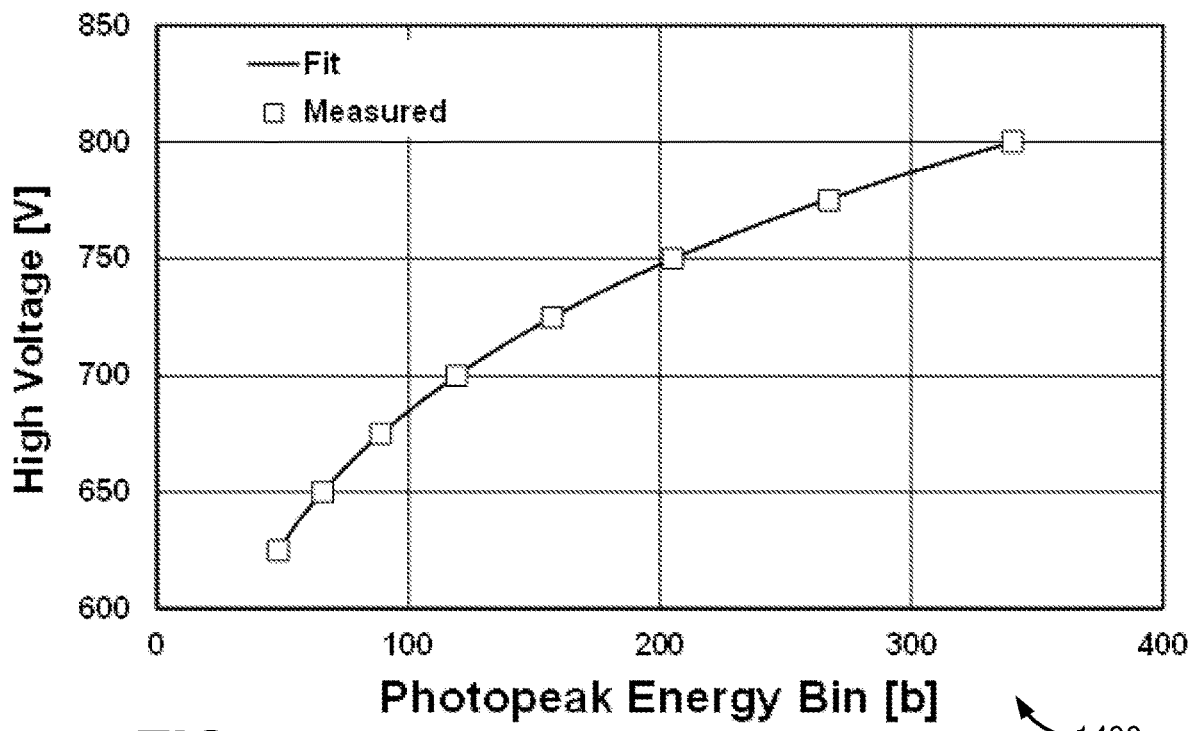
FIG. 14 is a graph illustrating voltage response curves for exemplary PMTs.

FIG. 14 is a graph illustrating a voltage response curve for an exemplary photomultiplier tube. The electrical pulse amplitude for photopeak events is plotted on the horizontal axis, and the applied PMT high voltage is plotted on the vertical axis. Although the electrical pulse amplitude can be measured natively in Volts, it can be advantageous to convert the data so that photopeak pulse is plotted in energy bin units b.

Figure 15:
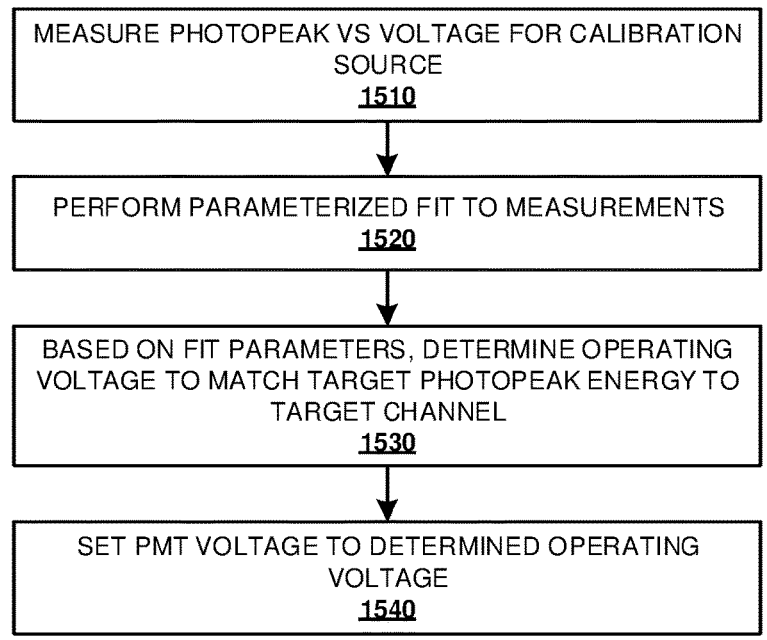
FIG. 15 is a flowchart of a method for tuning a PMT voltage for some micro-dose calibrator embodiments.

FIG. 15 is a flowchart 1500 of a method for tuning a PMT voltage. At process block 1510, multiple measurements of photopeak b and voltage V are made for the test PMT using a calibration source; this data can be similar to the data plotted in FIG. 14. At process block 1520, the data or graph can be fitted to an expression of the form $$V = f(b) = \alpha + \beta \cdot \log_{10} b + \gamma \cdot (\log_{10} b)^2 \tag{1}$$

to determine parameters $\alpha$, $\beta$, $\gamma$ specific to the test PMT. To achieve a photopeak at bin b0, the above equation is evaluated for the test PMT to obtain the operating voltage V0=f(b0) yielding a photopeak at bin b0. The method of FIG. 15 saves a great deal of trial and error, and the illustrative parametric expression has been found to provide suitable accuracy for Hamamatsu Model R1166 photomultiplier tubes. One of ordinary skill will appreciate that the same or similar parametric expressions can be suitably used with other PMT models.

Figure 16:
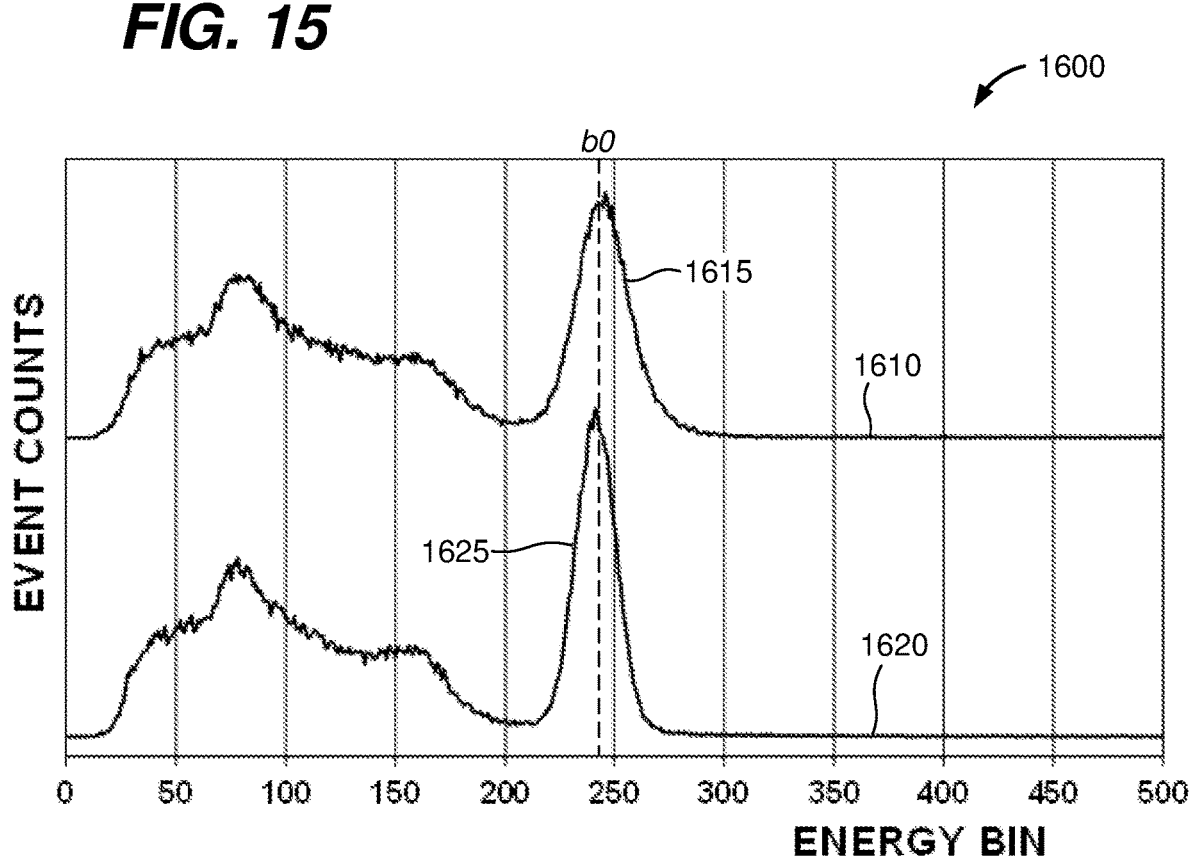
FIG. 16 is a graph illustrating energy spectra of tuned PMTs.

Finally, FIG. 16 is a graph 1600 illustrating energy spectra 1610, 1620 of calibrated photomultiplier tubes, and shows exemplary results after tuning, with the same PMTs and source as in FIG. 13. With voltages of both PMTs tuned, both photopeaks 1615, 1625 are aligned at the target bin b0, as desired.

Deadtime Correction

When a PMT responds to incoming light and generates an output pulse, the packetizer integrates the PMT output signal over an integration time window which depends on the scintillator material and the PMT, but can be on the order of 1 μs. During this integration time window, a second event cannot be separately detected, which means that the detection subsystem is effectively "dead" for purposes of detecting other events for the duration of the integration time window. By way of illustration, at a count rate of 1 kHz and a single-event deadtime of 1 μs, the PMT experiences 1 ms deadtime each second, which is much less than 1% and unlikely to compromise measurement accuracy. However, at a 200 kHz scintillation rate, the deadtime is on the order of 200 ms every second, or 20%. Thus, in order to maintain accuracy at higher radioactivity levels, and extend the operating range of a micro-dose calibrator, it can be desirable to implement deadtime correction. Other factors such as voltage droop can also contribute to deadtime.

FIGS. 17-21 illustrate the problem and the solution.

Figure 17:
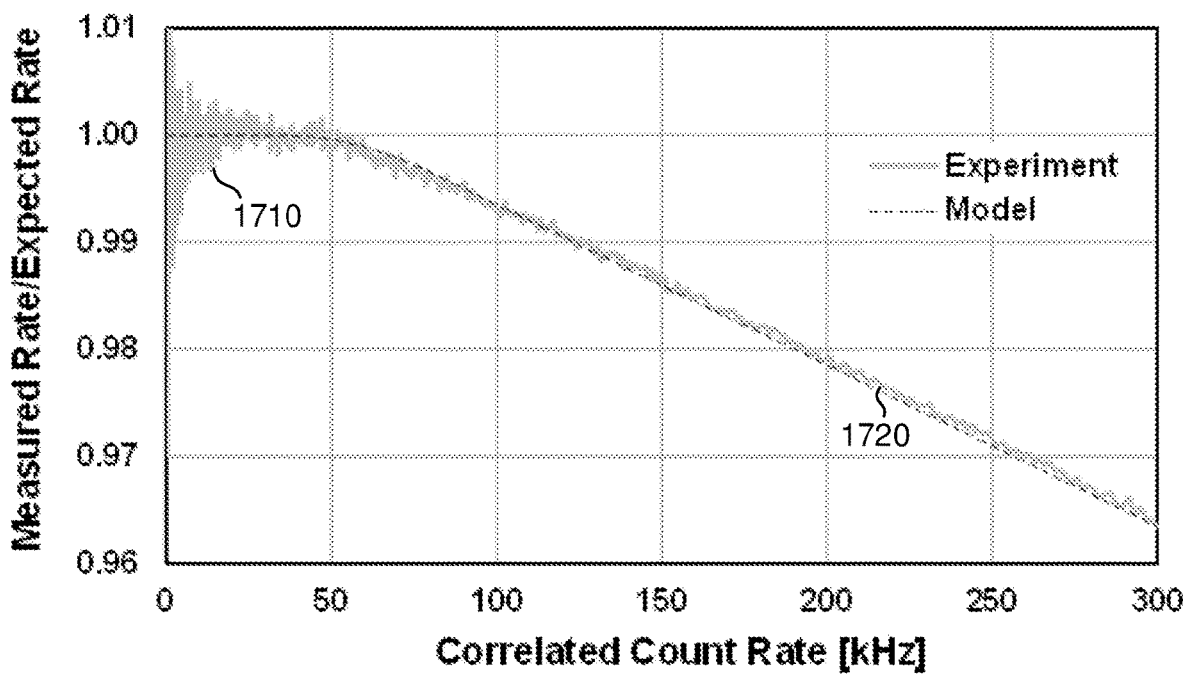
FIG. 17 is a graph showing data from which a deadtime model is determined.

FIG. 17 is a graph 1700 showing data from which a deadtime model is determined. The solid gray curve 1710 shows the ratio of measured rate (i.e. correlated count rate) to expected rate, as a function of the correlated count rate, for a decaying calibration source. As a source of known strength decays, the measured correlated count rate decreases. At low strength, and after subtracting for background counts, deadtime effects are negligible, and the measured rate is the expected rate, so that the ratio of measured rate to expected rate is unity. At higher strengths, deadtime effects cause some fraction of events to escape counting, and the measured rate droops below the expected rate as shown. In the absence of deadtime, the solid gray curve 1710 should be a level straight line. The deviation from linearity is caused by deadtime; this data can be used to determine parameters of a deadtime model. Deadtime model and dashed line 1720 are described below.

Figure 18:
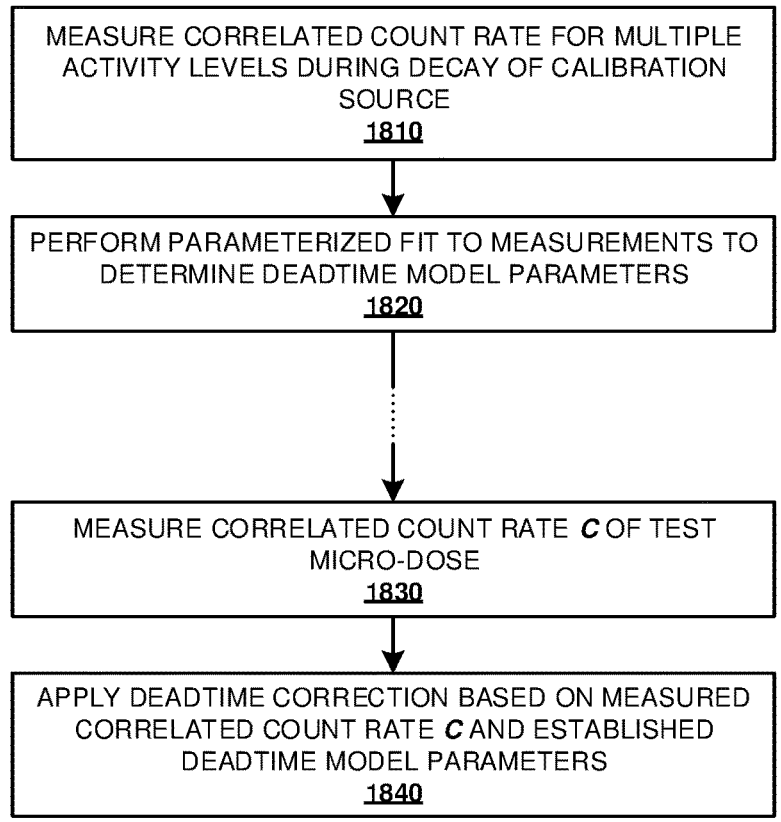
FIG. 18 is a flowchart of a method for determining and applying a deadtime correction.

FIG. 18 is a flowchart 1800 of a method for determining and applying a deadtime correction. At process block 1810, correlated count rate C is measured for the micro-dose calibrator using a calibration source at different activity levels. In some embodiments, the varying activity levels can be obtained by natural decay of the calibration source, while in other embodiments, separate sources can be provided at different activity levels. With known activity levels, the correlated count rate data can be represented in a form similar to the experimental data 1710 of FIG. 17. At process block 1820, the data or graph can be fitted piecewise to a straight line for high values of correlated count rate, unity for low values of correlated count rate, and to a parabolic curve for intermediate values of correlated count rate, with constraints that slopes and values match at the junction of two piecewise fits:

$$L=1 \text{ for } C<C_0;$$

$$L=1-\lambda \cdot (C-C_0)^2 \text{ for } C_0 \leq C<C_1; \text{ and}$$

$$L=\xi-\rho \cdot (C-C_1) \text{ for } C_1 \leq C. \quad (2)$$

L is the live time fraction, which is one minus the deadtime. The constants $\lambda$, $C_0$, $C_1$ of the piecewise fit define the deadtime model. The constants $\xi$, $\rho$ are not independent, but are determined by the matching constraint at $C=C_1$:

$$\rho=2\lambda \cdot (C_1-C_0)$$

$$\xi=1-\lambda \cdot (C_1-C_0)^2 \quad (3)$$

An exemplary piecewise fit is indicated by dashed line 1720 in FIG. 17.

In some embodiments, a computer system such as 2500 incorporating some of the functional blocks of micro-dose calibrator software 530 can be configured to perform process blocks 1810 and 1820. The computer system can record event rates periodically at user-defined intervals to generate the required data and determine the deadtime correction model. Deadtime correction data can also be stored in a searchable database for future use.

Subsequently, the deadtime model can be used to determine deadtime corrections during use of a micro-dose calibrator. At process block 1830, a correlated count rate C is measured for a test micro-dose. At process block 1840, the deadtime correction is determined for the measured correlated count rate C using the parameters of the deadtime model determined at process block 1820, and this deadtime correction is applied to the correlated count rate C.

The method of FIG. 18 has been found to provide suitable accuracy for tested embodiments of a micro-dose calibrator.

One of ordinary skill will appreciate that the same or similar parametric expressions can be suitably used in other embodiments.

Figure 19:
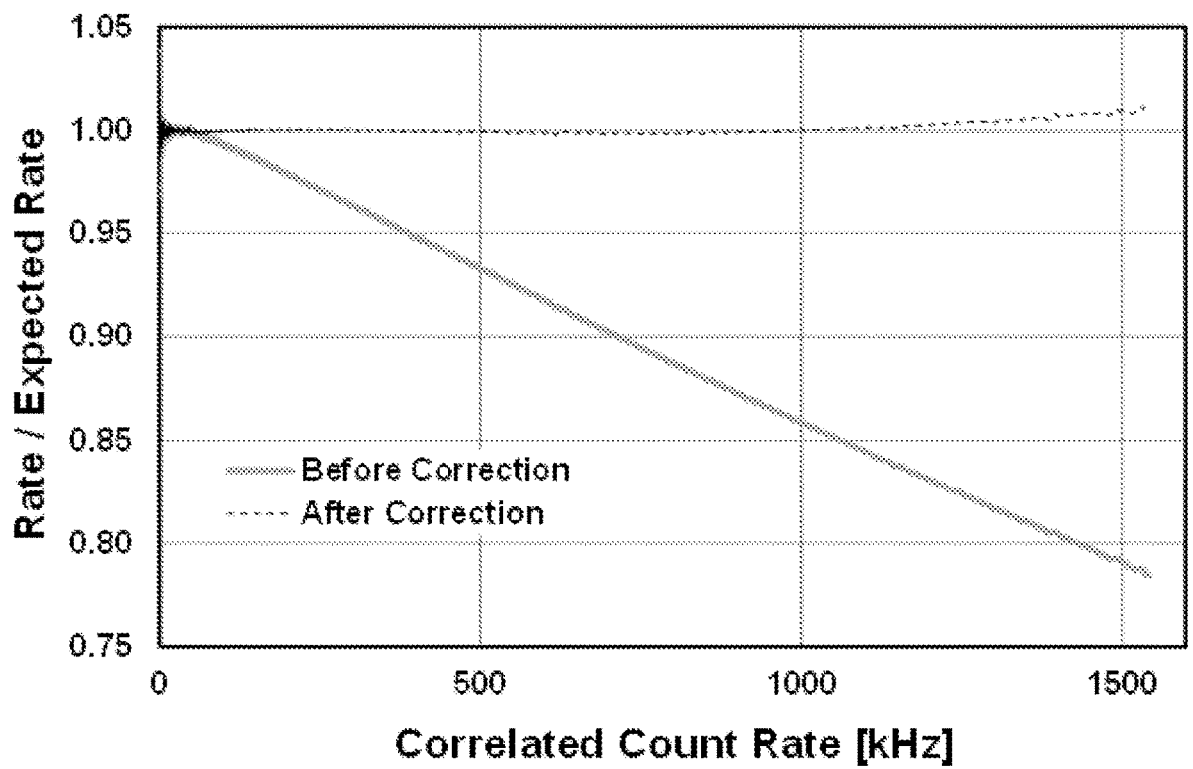
FIG. 19 is a graph showing linearity of micro-dose calibrator measurements with and without deadtime correction.

FIG. 19 is a graph 1900 showing linearity of micro-dose calibrator measurements with and without deadtime correction. Solid gray curve 1910 is the ratio of measured rate (i.e. correlated count rate) to expected rate, before deadtime correction is applied, and is similar to curve 1710 of FIG. 17. With deadtime correction applied, dashed line 1920 is obtained, which demonstrates the effectiveness of the deadtime correction.

Figure 20:
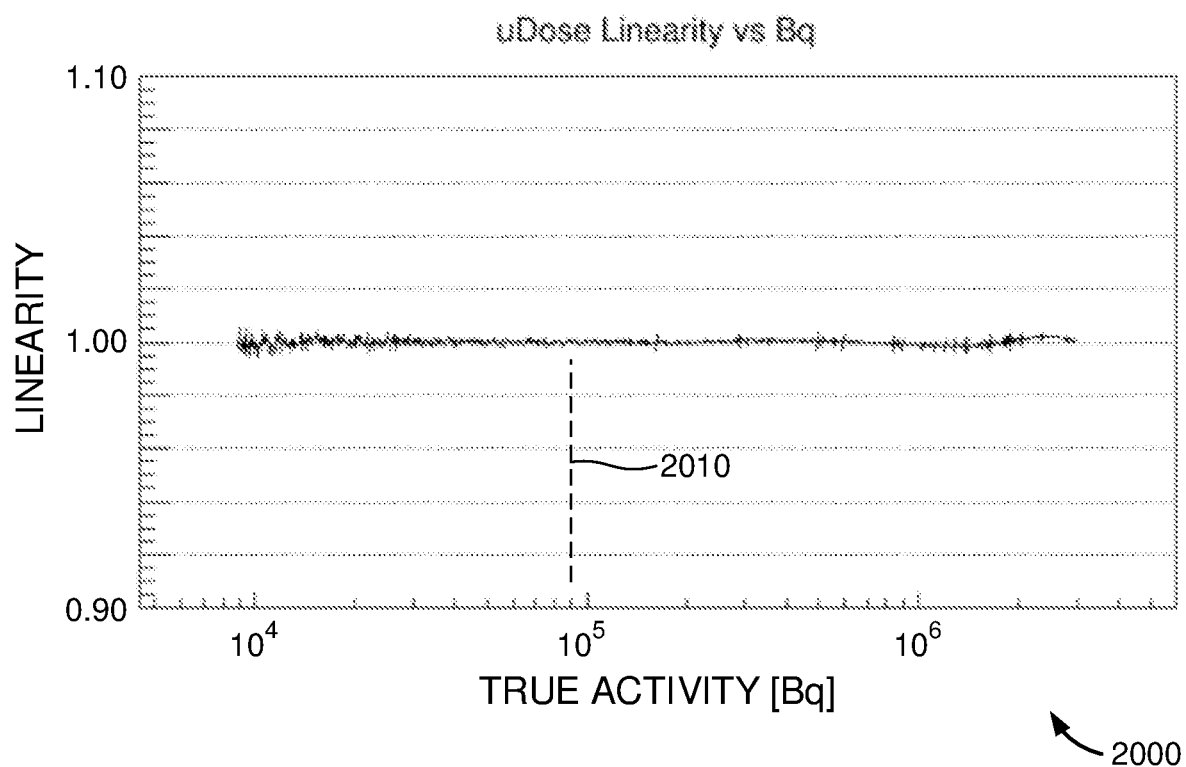
FIGS. 20-21 are graphs showing linearity of micro-dose calibrator measurements.
Figure 21:
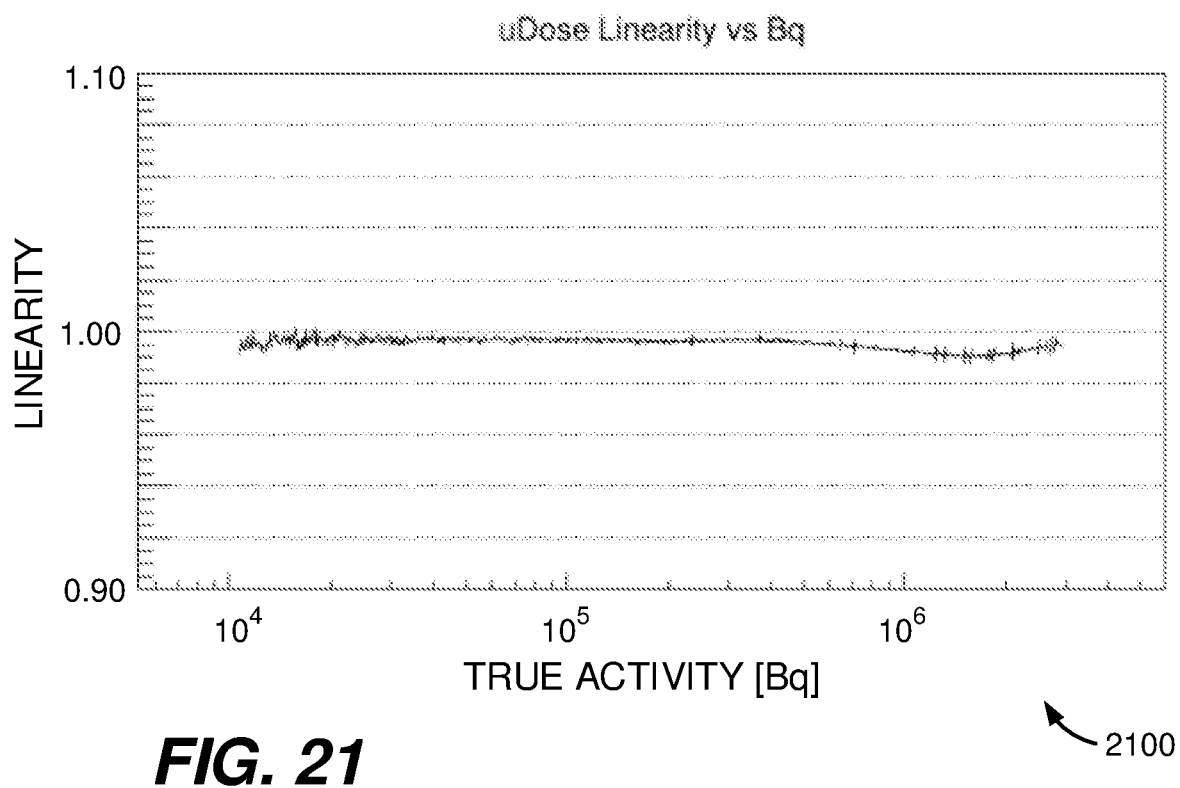

FIGS. 20-21 further illustrate the effectiveness of the deadtime correction procedure. FIG. 20 is a graph from a first experiment with a decaying $^{18}$F source. A source of known strength was provided, and calibrated count rates were measured as the source decayed from approximately 3 MBq to 10 kBq, a dynamic range of 300. The true activity was determined as a function of time from the exponential decay of $^{18}$F. Low rate data below about 90 kBq (indicated by dashed line 2010) was used to establish the deadtime model parameters as described herein. The deadtime model was applied to all the data, and the ratio of measured activity to true activity is shown on the y-axis. It can be seen that the measurements from 90 kBq to 300 kBq are accurate to 1% using the deadtime model, thus demonstrating the validity of the model.

FIG. 21 is a graph of a second experiment similar to the first. However, the deadtime model from the first experiment was used in processing correlated count rates of the second experiment. It can be seen that the measurements from 10 kBq to 300 kBq are accurate to 1% using the predetermined deadtime model, thus demonstrating the robustness of the model. That is, the deadtime model can be established with a calibration source and applied to a spot measurement of a sample micro-dose. Although FIGS. 20-21 were obtained with similar sources, one of ordinary skill will appreciate that the deadtime model of one nuclide can be extended to another nuclide. Further, the deadtime model of one micro-dose calibrator can be adjusted or extrapolated to another micro-dose calibrator, of same or different design.

Generalized Deadtime Model

In some embodiments, the sensitivity of a multi-segment micro-dose calibrator can be affected by operational conditions in the presence of high radioactivity levels. Exemplary operational conditions can include triggering thresholds, analog pulse shaping circuitry, digital pulse shaping via software instructions executed on the digitized pulse signal, or any other operational condition.

In such embodiments, the pulse pileup deadtime correction model can be extended, with more piecewise intervals or additional functional forms, to match the measured pulse-pileup dead time response. The general form of the pulse pileup dead time response model can include any number (1-3, 4-10, 11-20, or even more) of parametrized equations over respective piecewise intervals covering a range of correlated count rate. The junction of two adjacent piecewise intervals can be dubbed a "rate boundary." The equations or functions on either side of the rate boundary can be continuous at the rate boundary. The slopes of these functions can also be continuous across the rate boundary.

For example, a deadtime model having six intervals can be used, according to:

$$L=1 \text{ for } C<C_{C-Q};$$

$$L=1-\lambda \cdot (C-C_{C-Q})^2 \text{ for } C_{C-Q} \leq C<C_{Q-L};$$

$$L = \xi - \rho \cdot (C - C_{Q\text{-}L}) \text{ for } C_{Q\text{-}L} \le C < C_{L\text{-}Q};$$

$$L = d + e \cdot (C - C_{QM})^2 \text{ for } C_{L\text{-}Q} \le C < C_{QM};$$

$$L = d + f \cdot (C - C_{QM})^2 \text{ for } C_{QM} \le C < C_{Q\text{-}P};$$

$$L = g + h \cdot (C - C_{Q\text{-}P}) \text{ for } C_{Q\text{-}P} \le C. \quad (4)$$

In the model of equation (4), L and C are the live fraction and correlated count rate, as before. The first three rows of equation (4) describe constant, quadratic, and negative linear slope piecewise intervals respectively, similar to equation (2), with rate boundaries at $C_{C\text{-}Q}$ (between constant and quadratic intervals), and $C_{Q\text{-}L}$ (between quadratic and linear intervals). The next two rows describe a biphase quadratic pair of intervals joined at a quadratic extremum $C_{QM}$. Finally, the last row of equation (4) describes a piecewise interval that can have positive slope. The biphase quadratic pair of intervals has further rate boundaries at $C_{L\text{-}Q}$ and $C_{C\text{-}P}$ as indicated. Taking the five rate boundaries as free parameters, along with λ, d, and f, the remaining parameters in equation (4) can be determined by applying boundary conditions of continuity and continuous slope:

$$\xi = 1 - \lambda \cdot (C_{Q-L} - C_{C-Q})^2; \quad (5)$$

$$\rho = 2\lambda \cdot (C_{Q-L} - C_{C-Q});$$

$$e = \frac{\xi - d + \rho \cdot (C_{L-Q} - C_{Q-L})}{(C_{QM} - C_{L-Q})^2};$$

$$g = d + f \cdot (C_{Q-P} - C_{QM})^2;$$

$$h = 2f \cdot (C_{Q-P} - C_{QM}).$$

Graphical User Interfaces

Figure 22:
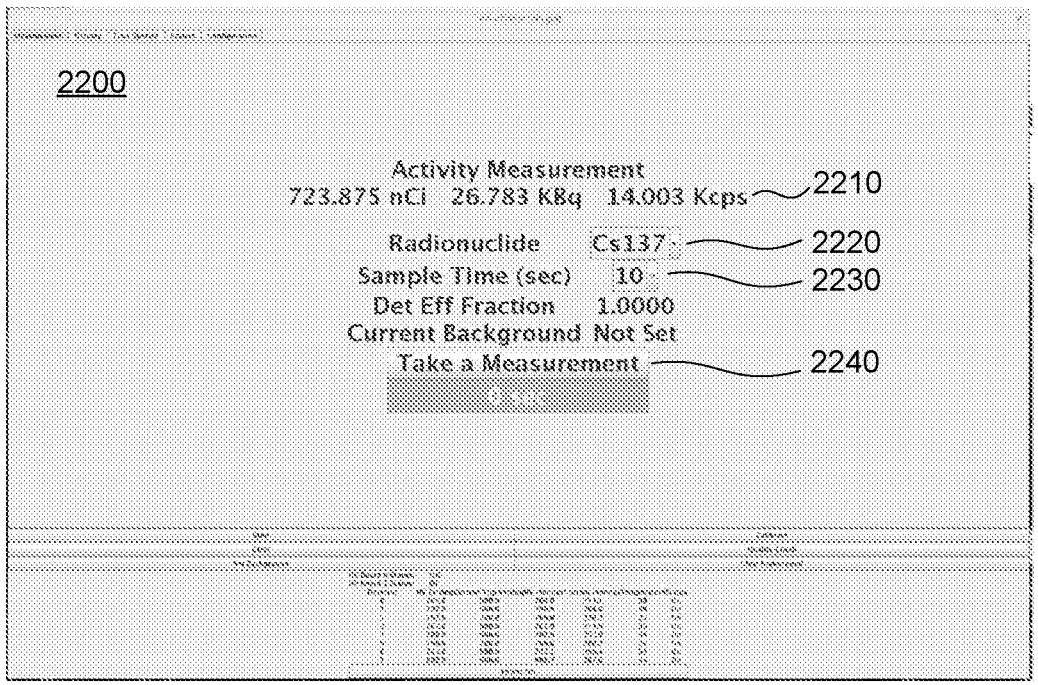
FIGS. 22-23 are screenshots of an activity measurement console of an embodiment of a micro-dose calibrator.
Figure 23:
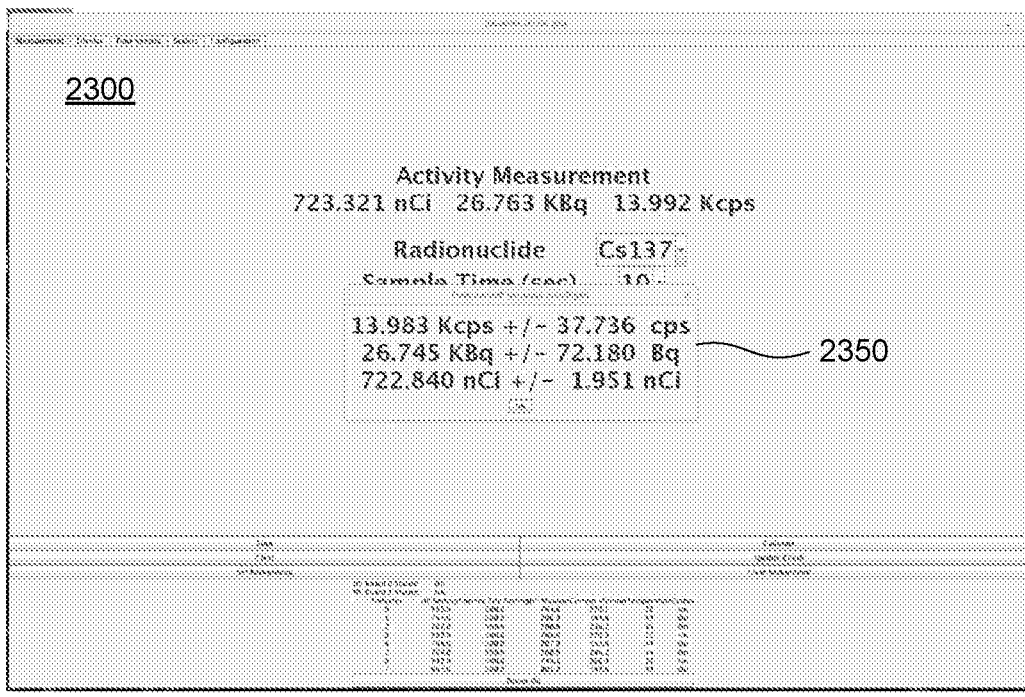

FIGS. 22-23 are screenshots 2200, 2300 of an activity measurement console of an exemplary micro-dose calibrator. Screenshot 2200 represents a quiescent state of the activity measurement console. Fields 2210 show results of a previous measurement, presented in three different units: nanocuries (nCi), kilobecquerels (KBq), and kilo-counts-per-second (Kcps). Fields 2220-2230 show measurement parameters that can be set by drop-down menus, including a sample radionuclide ($^{137}$Cs in the illustration) and measurement time for the micro-dose calibration (Sample Time of 10 s in the illustration). Button 2240 can be selected by a user, either locally or remotely, to launch a micro-dose calibration measurement.

Screenshot 2300 shows the activity measurement console after completion of a measurement, wherein measurement results are shown in a message window 2350, in one or more different units, along with respective uncertainty measures. The uncertainty measure (for example ±72.180 Bq) can incorporate counting statistics errors scaling as √N, where N is a number of counts received.

Figure 24:
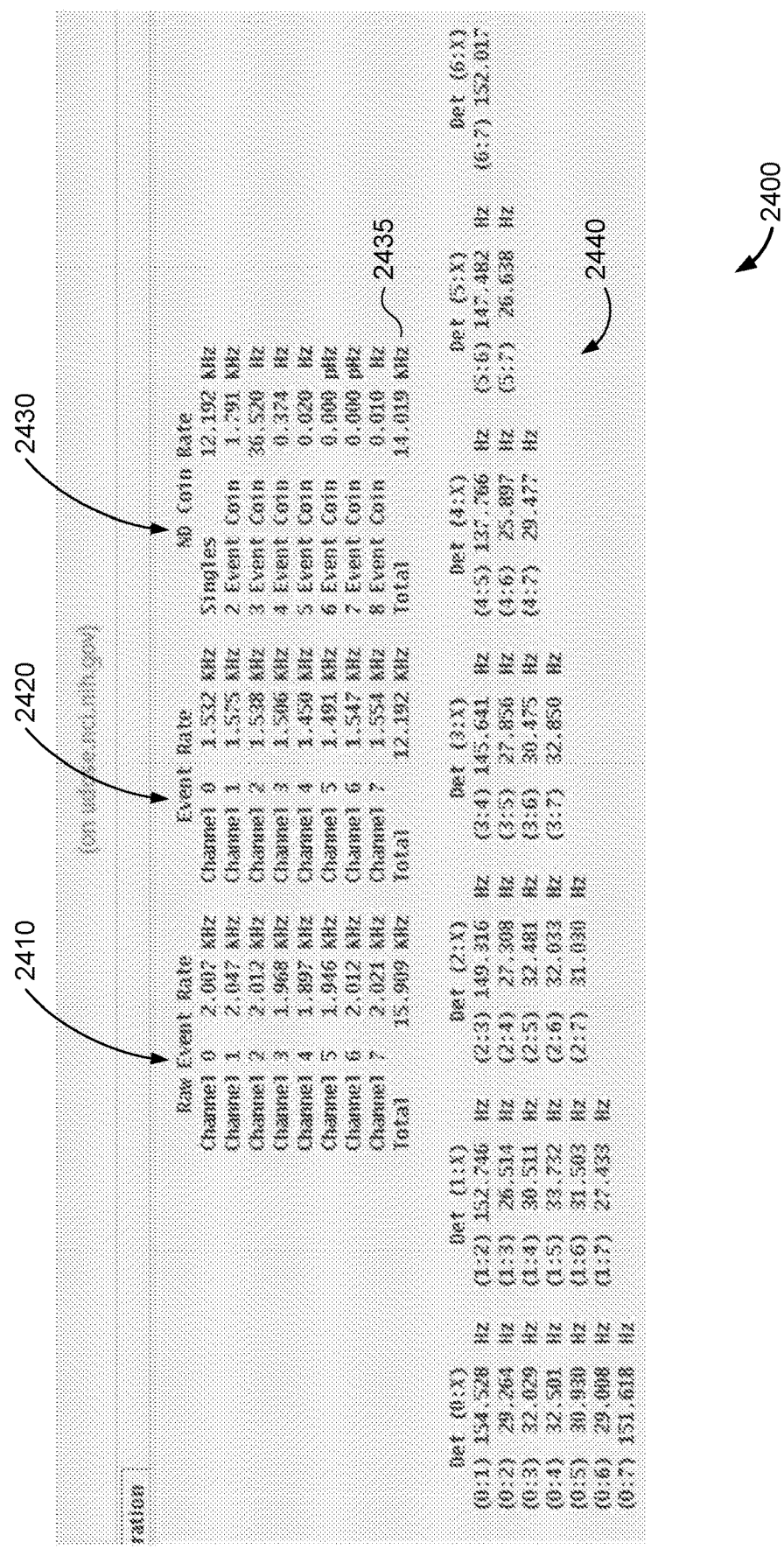
FIG. 24 is a screenshot of a scaler monitor user interface.

FIG. 24 is a screenshot 2400 of a scaler monitor user interface for an exemplary micro-dose calibrator having eight scintillation detectors. Column 2410 displays the raw event rate for each detector, labeled Channel 0 through Channel 7. Column 2420 displays singles rates for each scintillation detector after coincidence processing. Finally, column 2430 displays the detected event rates grouped by coincidence type. In column 2430, the Singles rate is the total rate of events that do not occur in coincidence with any other scintillation detector, and is equal to the sum of singles rates for the individual detectors shown in column 2420. (A discrepancy in the least significant digit is a rounding artifact, arising from the micro-dose calibrator software maintaining internal calculations to a higher precision than indicated on the scaler monitor screen.) The entry for "2 Event Coin" represents the rate of two-way coincidences (that is, events in which a primary event on one scintillation counter was found to be in coincidence with a secondary event on exactly one additional detector) determined from coincidence processing. The entries for 3-8 Event coincidences are similar; an 8-way coincidence means that a primary event on one detector was found to have coincident secondary events on all of the other seven detectors. The sum of entries for singles through "8 Event Coin" in column 2430 is the correlated event rate 2435.

Also shown in FIG. 24 is a pairwise table 2440, each entry of which indicates the rate of coincidences observed between the associated detector pair. For example, the second entry in the "Det (3:X)" column is labeled "(3:5)" and has a value 27.856 Hz. This means that two-way coincidences are observed between detectors numbered 3 and 5 at a rate of 27.856 Hz. This includes coincidences for which detector 3 was primary, and coincidences for which detector 5 was primary. Three-way and higher order coincidences are excluded from the displayed two-way coincidence rate. For the single-gamma emitter $^{137}$Cs used in this example, it can be seen that coincidence rates between adjacent detectors is significantly higher than for other pairs, in line with expectations for coincidences arising from Compton scattering. Other radioactive sources generating correlated gammas (such as from a positron source) or multiple uncorrelated gammas will exhibit different patterns.

EXAMPLE 4

Computer System

Figure 25:
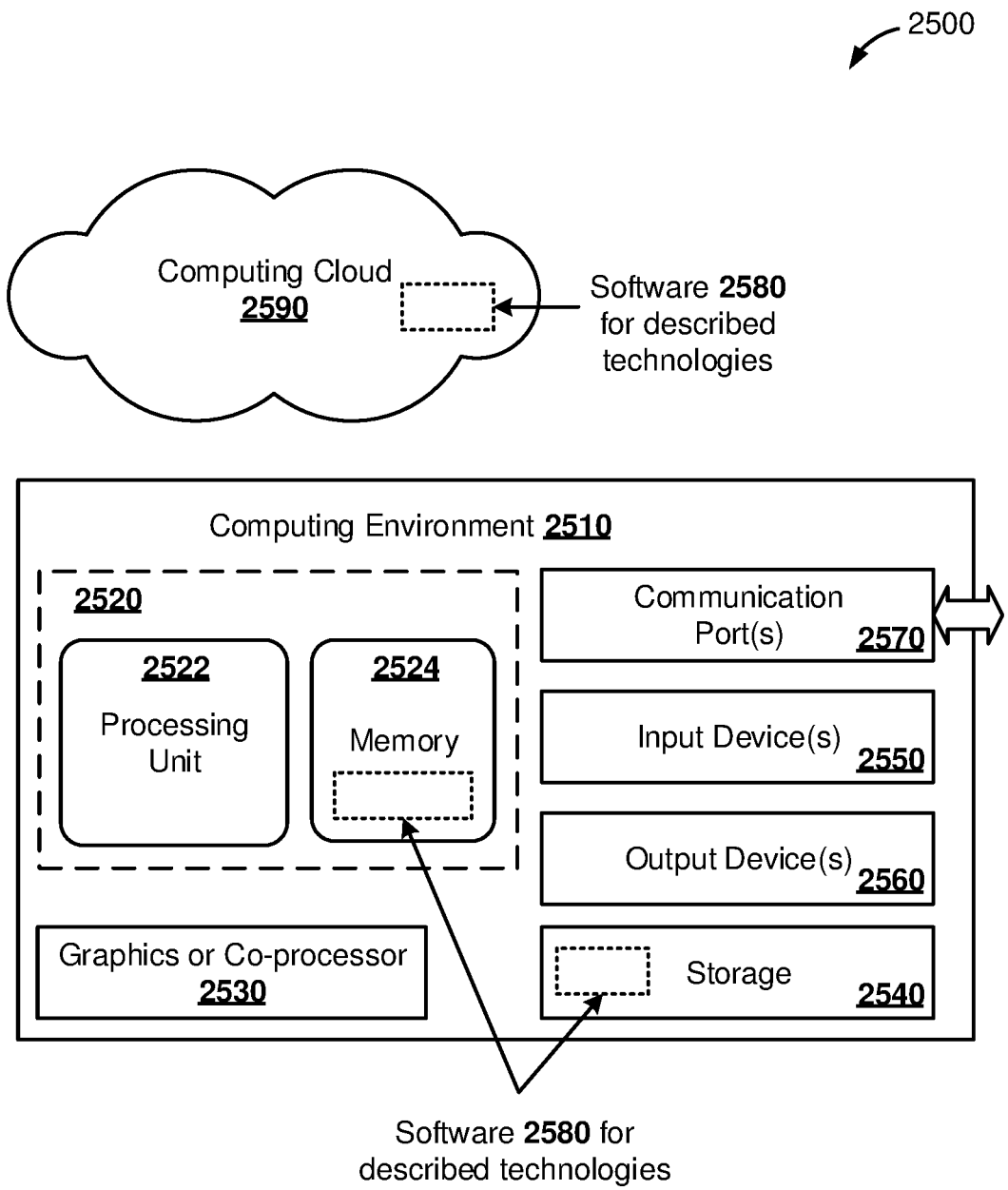
FIG. 25 is a block diagram of a computer system suitable for a disclosed micro-dose calibrator.

FIG. 25 illustrates a generalized example of a suitable computing system 2500 in which described examples, techniques, and technologies for operation and calibration of a micro-dose calibrator can be implemented. For example, components of micro-dose calibrator software 530, or parts of methods described herein, can be implemented by computing system 2500. The computing system 2500 is not intended to suggest any limitation as to scope of use or functionality of the present disclosure, as the innovations can be implemented in diverse general-purpose or special-purpose computing systems.

With reference to FIG. 25, computing environment 2510 includes one or more processing units 2522 and memory 2524. In FIG. 25, this basic configuration 2520 is included within a dashed line. Processing unit 2522 executes computer-executable instructions, such as for implementing any of the methods, software objects, graphical user interface components or supporting functionality for operating, configuring, monitoring, or calibrating a micro-dose calibrator. Processing unit 2522 can be a general-purpose central processing unit (CPU), a processor in a field programmable gate array (FPGA), a processor in an application-specific integrated circuit (ASIC), an embedded processor, or any other type of processor. In a multi-processing system, multiple processing units execute computer-executable instructions to increase processing power. Computing environment 2510 can also include a graphics processing unit or co-processing unit 2530. Tangible memory 2524 can be volatile memory (e.g., registers, cache, or RAM), non-volatile memory (e.g., ROM, EEPROM, or flash memory), or some combination thereof, accessible by processing units 2522, 2530. The memory 2524 stores software 2580 implementing one or more innovations described herein, in the form of computer-executable instructions suitable for execution by the processing unit(s) 2522, 2530. The memory 2524 can also store configuration data, radioactive nuclide tables, calibration or correction parameters, parameters for voltage tuning, or parameters of a deadtime model, as well as other configuration and operational data.

A computing system 2510 can have additional features, such as one or more of storage 2540, input devices 2550, output devices 2560, or communication ports 2570. An interconnection mechanism (not shown) such as a bus, controller, or network interconnects the components of the computing environment 2510. Typically, operating system software (not shown) provides an operating environment for other software executing in the computing environment 2510, and coordinates activities of the components of the computing environment 2510.

The tangible storage 2540 can be removable or non-removable, and includes magnetic disks, magnetic tapes or cassettes, CD-ROMs, DVDs, or any other medium which can be used to store information in a non-transitory way and which can be accessed within the computing environment 2510. The storage 2540 stores instructions of the software 2580 (including instructions and/or data) implementing one or more innovations described herein.

The input device(s) 2550 can be a mechanical, touch-sensing, or proximity-sensing input device such as a keyboard, mouse, pen, touchscreen, trackball, a voice input device, a scanning device, or another device that provides input to the computing environment 2510. The output device(s) 2560 can be a display, printer, speaker, optical disk writer, or another device that provides output from the computing environment 2510.

The communication port(s) 2570 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 2500 can also include a computing cloud 2590 in which instructions implementing all or a portion of the disclosed technology are executed. Any combination of memory 2524, storage 2540, and computing cloud 2590 can be used to store software instructions and data of the disclosed technologies.

Some present innovations can be described in the general context of computer-executable instructions, such as those included in program modules, being executed in a computing system on a target real or virtual processor. Generally, program modules or components include routines, programs, libraries, software objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

One or more disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 25, computer-readable storage media include memory 2524, and storage 2540. The term computer-readable storage media does not include signals and carrier waves. In addition, the term computer-readable storage media does not include communication ports (e.g., 2570) or communication media.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

In view of the many possible embodiments to which the principles of my innovations may be applied, it should be recognized that illustrated embodiments are only examples and should not be considered a limitation on the scope of the invention. Rather, the scope of the invention is defined by the following claims.

I claim:

1. An apparatus for calibration of a radioactive micro-dose sample, the apparatus comprising:
   a receptacle containing a sample chamber and configured to retain the radioactive micro-dose sample;
   an array of at least three scintillation detectors disposed around the sample chamber;
   an array of light transducers, each light transducer optically coupled to a respective one of the scintillation detectors; and
   a plurality of electronic counters comprising an electronic counter for each respective scintillation detector;
   wherein each light transducer is electrically coupled to a respective one of the electronic counters for independently counting radioactive decay events of the micro-dose sample detected by the respective scintillation detector.

2. The apparatus of claim 1, wherein each of the electronic counters is configured to time-tag digital packets of the radioactive decay events of the micro-dose sample corresponding to particles detected by the respective scintillation detector.

3. The apparatus of claim 1, further comprising one or more hardware processors configured to:
   receive time-tagged events from the electronic counters;
   compare time stamps of the time-tagged events;
   detect multiple events of the time-tagged events as a coincidence for a case where the time stamps of the multiple events are within a coincidence window;
   determine a correlated event rate by counting the time-tagged events from the electronic counters with the multiple events collectively counted as one event; and
   determine a calibrated micro-dose strength of the radioactive micro-dose sample by application of one or more calibrations or corrections to the correlated event rate.

4. The apparatus of claim 3, wherein the multiple events are three or more events.

5. The apparatus of claim 3, wherein the determining the correlated event rate comprises determining an intermediate rate for each of the scintillation detectors, the intermediate rate being a rate of events detected by the each scintillation detector that are not in coincidence with any of the events detected by any other of the scintillation detectors.

6. The apparatus of claim 1, wherein the array of scintillation detectors is arranged as a ring of 4 to 100 contiguous scintillation detectors having shapes that conform to adjacent scintillation detectors.

7. The apparatus of claim 6, wherein gaps between neighboring detectors of the ring of contiguous scintillation detectors have a maximum width in a range 0.001-5 mm.

8. The apparatus of claim 1, wherein the scintillation detectors are contiguously disposed over at least a hemisphere about a center of the sample chamber.

9. The apparatus of claim 1, further comprising an adjustable stage operable to position the micro-dose at a central location of the array of scintillation detectors.

10. The apparatus of claim 1, further comprising a holder configured to be reproducibly positioned within the sample chamber, and further configured to retain a sample container storing the radioactive micro-dose sample, wherein the sample container is a syringe, a vial, or a test tube.

11. The apparatus of claim 1, wherein the apparatus is operable to calibrate the radioactive micro-dose sample to 1% accuracy for radioactive micro-dose samples having any gamma or x-ray radioactivity in the range of 10 nanocuries to 10 microcuries.

12. The apparatus of claim 1, further comprising one or more synchronization cables connecting the electronic counters.

13. The apparatus of claim 1, wherein each electronic counter comprises: a signal input connected to a light transducer; a discriminator; a time-tagger; a packetizer; and an accumulator.

14. The apparatus of claim 1, further comprising a computer system having one or more processors, memory coupled thereto, and computer-readable media storing instructions which, when executed by the one or more processors, cause implementation of:
an interactive user interface configured to receive input for commencing a calibration procedure on the radioactive micro-dose sample, and to present a calibrated micro-dose strength of the radioactive micro-dose sample subsequent to the calibration procedure.

15. One or more computer-readable media storing instructions which, when executed by one or more hardware processors, cause the one or more hardware processors to perform operations comprising:
synchronizing respective counting electronics for an array of at least three scintillation detectors; and
time-tagging and counting digital packets of micro-dose decay events independently for each of the scintillation detectors.

16. The one or more computer-readable media of claim 15, wherein the operations further comprise:
performing coincidence processing on the time-tagged events to determine a correlated event rate; and
determining the radioactivity level of the micro-dose based on the correlated event rate.

17. The method of claim 16, wherein the determined radioactivity level is within a range of 10 nanocuries to 100 microcuries and has an error less than or equal to 1%.

18. A method for calibrating a radioactive micro-dose, comprising:
providing a ring of scintillation detectors coupled by photodetectors to respective counting electronics;
tuning high-voltage power supplies coupled to the photodetectors so that photopeaks of particles emitted by a radioactive calibration source appear at aligned energy channels at the respective counting electronics;
positioning a sample container containing a radioactive micro-dose at a central location of the ring of scintillation detectors;
synchronizing the counting electronics;
time-tagging decay events detected at the scintillation detectors, independently for each scintillation detector;
detecting coincidences among the time-tagged decay events from two or more of the scintillation detectors;
aggregating time-tagged decay events from the scintillation detectors, with coincidences being singly counted, to obtain a correlated event rate;
determining a micro-dose radioactivity level by applying at least a basic calibration factor to the correlated event rate; and
reporting the determined micro-dose radioactivity level.

19. The method of claim 18, wherein the correlated event rate is a first correlated event rate, and the method further comprises:
determining second correlated event rates by measuring decay events detected by the ring of scintillation detectors during decay of a calibration source;
performing a parameterized fit of the determined second correlated event rates as a function of strength of the calibration source to determine deadtime model parameters; and
evaluating the deadtime model at the first correlated event rate to determine a deadtime correction;
wherein the determining the micro-dose radioactivity level further comprises applying the deadtime correction.

20. The method of claim 19, wherein the parameterized fit is a segmented fit over a fixed first region associated with a first range of correlated event rates, a second region associated with a second range of correlated event rates, and a third region associated with a third range correlated event rates, wherein the third range is a transition range between the first range and the second range.

* * * * *